United States Patent
Dinwoodie

(10) Patent No.: US 7,428,501 B2
(45) Date of Patent: Sep. 23, 2008

(54) AUCTION SYSTEM FOR REMOTE BIDDING AND METHOD

(75) Inventor: David L. Dinwoodie, Flower Mound, TX (US)

(73) Assignee: Bidcatcher, L.P., Flower Mound, TX (US)

( * ) Notice: Subject to any disclaimer, the term of this patent is extended or adjusted under 35 U.S.C. 154(b) by 916 days.

(21) Appl. No.: 10/831,503

(22) Filed: Apr. 23, 2004

(65) Prior Publication Data

US 2005/0125331 A1    Jun. 9, 2005

Related U.S. Application Data

(63) Continuation-in-part of application No. 10/730,624, filed on Dec. 8, 2003.

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

| | | | | |
|---|---|---|---|---|
| 4,789,928 A | 12/1988 | Fujisaki | | 705/37 |
| 5,191,410 A | 3/1993 | McCalley et al. | | 725/114 |
| 5,247,347 A | 9/1993 | Litteral et al. | | 725/114 |
| 5,440,623 A | 8/1995 | Moore et al. | | 379/88.26 |
| 5,508,731 A | 4/1996 | Kohorn | | 725/24 |
| 5,537,143 A | 7/1996 | Steingold et al. | | 348/13 |
| 5,561,707 A | 10/1996 | Katz | | 379/88.16 |
| 5,563,937 A | 10/1996 | Bruno et al. | | 379/265.11 |
| 5,740,240 A | 4/1998 | Jolissaint | | 379/265.02 |
| 5,774,873 A | 6/1998 | Berent et al. | | 705/26 |
| 5,794,219 A | 8/1998 | Brown | | 705/37 |
| 5,815,551 A | 9/1998 | Katz | | 379/88.19 |
| 5,818,914 A | 10/1998 | Fujisaki | | 379/93.12 |
| 5,835,896 A * | 11/1998 | Fisher et al. | | 705/37 |

(Continued)

FOREIGN PATENT DOCUMENTS

DE         43 20 806         1/1995

(Continued)

OTHER PUBLICATIONS

Anon., "Liffe's APT Trading Systems Slated to Go Live in 1989," Trading systems Technology, vol. 2, No. 20, Apr. 24, 1989.*

(Continued)

*Primary Examiner*—Nicholas D Rosen
(74) *Attorney, Agent, or Firm*—Conley Rose, P.C.

(57) ABSTRACT

A system for conducting interactive auctions with remote bidders is provided. The system includes an auction system operable to maintain information related to a subject of an auction and a remote bidder system in communication with the auction system. The remote bidder system is operable to communicate a bid including bid information to the auction system based on a price for the subject of the auction. The auction system uses at least a portion of the bid information to accept the bid where the price for the subject of the auction is the same when the bid is processed by the auction system and to reject the bid where the price for the subject of the auction has changed when the bid is processed by the auction system.

19 Claims, 8 Drawing Sheets

U.S. PATENT DOCUMENTS

| | | | | |
|---|---|---|---|---|
| 5,890,138 | A | 3/1999 | Godin et al. | 705/26 |
| 5,905,975 | A | 5/1999 | Ausubel | 705/37 |
| 6,012,045 | A | 1/2000 | Barzilai et al. | 705/37 |
| 6,415,269 | B1 | 7/2002 | Dinwoodie | 705/37 |
| 6,677,858 | B1 * | 1/2004 | Faris et al. | 340/573.1 |
| 6,813,612 | B1 | 11/2004 | Rabenold et al. | 705/37 |
| 6,903,681 | B2 * | 6/2005 | Faris et al. | 342/357.06 |
| 2002/0087456 | A1 * | 7/2002 | Abeshouse et al. | 705/37 |
| 2002/0116320 | A1 * | 8/2002 | Nassiri | 705/37 |
| 2002/0165817 | A1 * | 11/2002 | Rackson et al. | 705/37 |
| 2003/0220867 | A1 * | 11/2003 | Goodwin et al. | 705/37 |
| 2004/0254804 | A1 * | 12/2004 | Peterffy et al. | 705/1 |
| 2005/0080707 | A1 * | 4/2005 | Glasspool | 705/37 |
| 2007/0226118 | A1 * | 9/2007 | Gill | 705/37 |

FOREIGN PATENT DOCUMENTS

| | | | |
|---|---|---|---|
| FR | 2658635 | | 8/1991 |
| GB | 2382162 A | * | 5/2003 |
| JP | 11066186 A | * | 3/1999 |
| NL | 9300266 | | 9/1994 |
| WO | WO 9215174 | | 9/1992 |
| WO | WO 9737315 | | 10/1997 |

OTHER PUBLICATIONS

Henry, E., "But Can You Get it Wholesale? A Survey of Internet Auction Sites Finds That Some Aren't Such a Deal," Kiplinger's Personal Finance Megazine, vol. 52, No. 7, p. 115, Jul. 1998.*

Maybury, R., "Boot Camp; Online Auctions PArt One Top Traumas Solved by Rick Maybury," Daily Telegraph, Oct. 14, 2003.*

Patent Application of Japan, Publication 10027, Video Auction System, Published Jan. 27, 1998.*

Patent Abstracts of Japan Publication No. 09-006871, Oct. 1, 1997, *Auction System and Terminal Device Using Communication Line.*

Patent Abstracts of Japan Publication No. 10027, Oct. 7, 1996, *Video Auction System.*

Gorda, B. and Wilson, Gregory, "Building and Running Online Auctions," Dr. Dobb's Journal, Oct. 1997, vol. 22, No. 10, pp. 84, 86-88, 91.

Office Action dated Dec. 10, 2007, U.S. Appl. No. 10/730,624, filed Dec. 8, 2003, 25 pages.

* cited by examiner

AUCTION SYSTEM FOR REMOTE BIDDING AND METHOD

CROSS-REFERENCE TO RELATED APPLICATIONS

The present application claims priority from and is a continuation-in-part of U.S. patent application Ser. No. 10/730,624, filed Dec. 8, 2003, entitled "Auction System for Remote Bidding and Method", invented by David L. Dinwoodie, which is hereby incorporated by reference for all purposes.

The present application contains subject-matter related to U.S. patent application Ser. No. 10/423,583, filed Apr. 25, 2003, entitled "Interactive Remote Auction Bidding System," which is a continuation in part of U.S. patent application Ser. No. 10/005,808, filed Dec. 3, 2001, entitled "Interactive Remote Auction Bidding System," which is a continuation-in-part of U.S. patent application Ser. No. 09/086,877 filed May 29, 1998, entitled "Interactive Remote Auction Bidding System," issued on Jul. 2, 2002, as U.S. Pat. No. 6,415,269, all of which are incorporated herein by reference for all purposes.

STATEMENT REGARDING FEDERALLY SPONSORED RESEARCH OR DEVELOPMENT

Not Applicable.

TECHNICAL FIELD OF THE INVENTION

The present invention relates to an interactive communications system, and more particularly, to an auction system allowing a plurality of remote bidders to participate in an auction on a real-time basis.

BACKGROUND OF THE INVENTION

Auction is a centuries old process. Scale (quantity of product and number of attendees) and reach (distance buyers or goods travel to participate in the auction) remain key factors determining success of an event. The more valuable the item, the more unique its market, the greater the distance product and buyer travel to achieve needed scale. Certain commodities (such as valuable equipment, boats, trophy properties, general aviation aircraft) apparently well suited to auction processes are rarely sold that way because of difficulty of achieving scale and reach while retaining live auction elements necessary to attract buyers. This applies specifically in both large equipment and with luxury or unique items which do not travel easily, but has more general application as well.

Remarketing surplus products is a challenge for manufacturers and dealers in many industries, and in particular the equipment industry. Stale new inventory and "slightly used" product competes for customers with goods direct from the assembly lines. Equipment ownership and usage patterns have changed and continue to change. Whereas most new product was once sold to end users, now many industry segments deliver more than 65% of new product to "Rental/Lease Fleets". Equipment sold is often guaranteed for its future value. Customers have transferred many elements of ownership risk to manufacturers and dealers by forcing sellers to provide rentals, leases, or future value guarantees. Consumer preference to rent is driven by a composite of factors including tighter lending standards, lack of tax incentives, increasing complexity and specialization of equipment, volatility of equipment values within their industries and increasing availability and competitiveness of short term equipment rental solutions. Rentals, long term leases, and "buy back" agreements provide customers use of equipment without the ownership obligations or liabilities. Manufacturers and dealers remain "at risk" and responsible for rental, lease and "buy back" equipment until its ultimate sale. In view of these marketing techniques, as well as improvements in the useful life of a product, the burden or remarketing more of these products after their first substantial use remains with manufacturers, dealers and other rental operators. In many cases, the most severe competition for new sales is generated by identical "used product" rather than by new product of competitive manufacturers.

Manufacturers and dealers have achieved success generating sales of new products, but typically have less success remarketing used equipment and transferring ownership obligations to end users. "After market" remarketing specialists such as brokers, traders, import-export entrepreneurs and retail auctioneers provide needed expertise for second and subsequent sales of equipment. These remarketing specialists sell in direct competition to new products sold by dealers and manufacturers.

Due to the diverse demographics of their markets, and fractured communication among dealers, dealers' effectiveness is limited to small geographic areas in proximity to their dealership. Dealers have limited knowledge or success trading outside local trading areas. Manufacturers encourage "local" market focus. Whereas "local" focus for new equipment may be effective, remarketing surplus equipment locally limits potential and is largely an ineffective and costly strategy. At the same time, effort expended, travel costs, language, currency, cultural and information barriers plus lack of critical mass in any single market make venturing beyond local trade areas expensive, risky, inefficient, and often counterproductive for dealers. Accordingly, remarketing used equipment has been inefficient.

Conventionally, auctions of used equipment or the like require that the equipment be brought to the auction site and presented by the seller where the auction takes place. Additionally, all participants to the auction must assemble at the auction site. Such an auction therefore is typically limited to regional geographic areas due to the costs of assembling equipment as well as participants. Scale is crucial to auction success. Scale attracts buyers. The more buyers the better the result. The more specialized the product, the greater the distance both buyer and product must travel for the auction to achieve scale or critical mass. Freight on large equipment is expensive, and moving equipment to an auction site and then removing the same equipment, if not sold, produces an inefficient non-value added expense. These expenses are further incurred by buyers traveling to auctions.

Similarly, auctions for expensive or unique goods (such as Art or Horses for example) will likewise receive significant benefit from the ability to less expensively bring scale to the auction (they do not have to move all of the goods to the auction site) and/or scale to the number of participants (they do not have to move all of the participants to the auction site). Advantages may be provided by a "real-time" auction information processing system which enables individuals dispersed over a wide geographic area to participate in an auction without gathering at the auction site. Advantages may also be provided by a system to allow individuals to participate in an auction without requiring a large investment in a technical infrastructure at the buyers'/bidders' remote locations.

SUMMARY OF THE INVENTION

In accordance with one embodiment, a system for conducting interactive auctions with remote bidders is provided. The system includes an auction system operable to maintain information related to a subject of an auction and a remote bidder system in communication with the auction system. The remote bidder system is operable to communicate a bid including bid information to the auction system based on a price for the subject of the auction. The auction system uses at least a portion of the bid information to accept the bid where the price for the subject of the auction is the same when the bid is processed by the auction system and to reject the bid where the price for the subject of the auction has changed when the bid is processed by the auction system.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
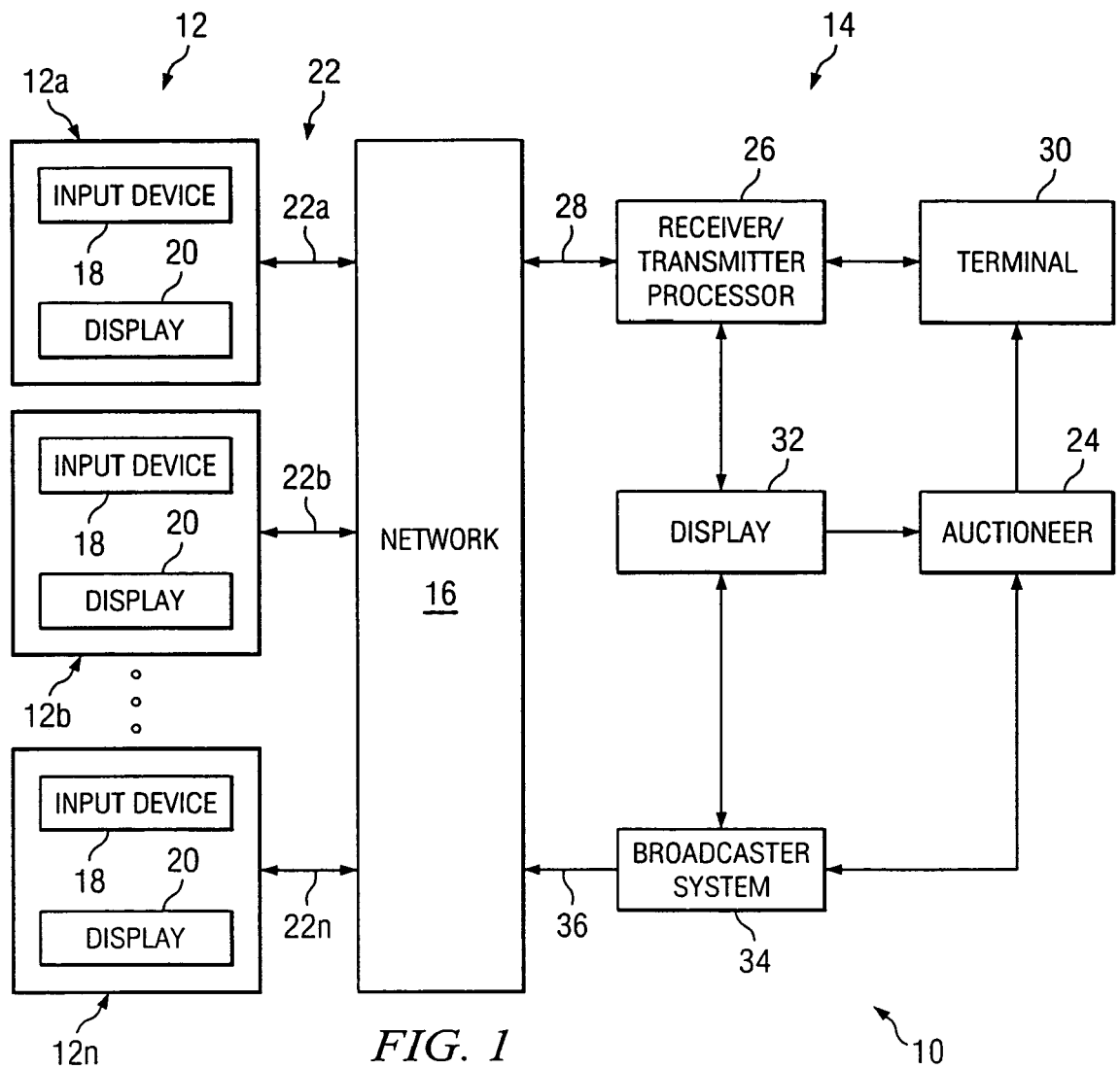
FIG. 1 is a block diagram of the present system.

Referring to FIG. 1, an interactive remote auction bidding system for conducting an auction among participants located at remote locations is illustrated, and is generally identified by the numeral 10. System 10 allows participants located at remote locations 12, 12a, 12b-12n to communicate with an auction site 14 via a communications network 16. Located at each remote site 12 is at least one data input device 18. Data input device 18 may comprise, for example, a conventional Touch Tone® telephone having a key pad which generates dual-tone multi-frequency signals (DTMF). Additionally, data input device 18 may include a cellular, digital, PCS or other wireless telephone, two-way pager, other radio wave transmitter/transponder, personal computer, personal digital assistant (PDA), or other wireless device for generating bid acceptance data for communication over the network 16 to auction site 14.

Each remote location 12 further includes a display device 20. Display device 20 receives information from auction site 14 via network 16, and may include, for example, a conventional television, a projection television in a theater setting, video telephone conferencing display, or a personal computer display. Communication between remote sites 12 and network 16 takes place over communications links 22, 22a, 22b-22n.

While in the preferred embodiment, remote locations 12 are in geographically distant locations, one of skill in the art will recognize that the described system may have benefits for anybody who does not have direct visual or auditory contact with the auctioneer. Hence, participants in a separate building in the same complex, in a separate room in the same building, or even in the same hall but relying on a display device 20 or data input device 18 to successfully participate could constitute "remote" participants and such buildings, or rooms, or even portions of rooms serviced by such equipment could constitute "remote" locations.

Communications network 16 may include, for example, and is not limited to, a conventional telephone network, cellular network, paging network, virtual private network, satellite communications system, cable broadcast system, and television broadcast system. Network 16 may comprise a combination of various types of communications systems for communicating data between remote locations 12 and auction site 14. The configuration of network 16 depends upon the type of equipment used by participants at remote locations 12, and in its simplest form may include a telephone switching network and broadcast television system, while in other embodiments, the configuration will include the Internet either alone or in combination with other communication systems. In some embodiments, network 16 comprises a network between auction site 14 and input devices 18 comprising a multitude of individual connections (one per input device) with individual exchange of information and a separate broadcast network between auction site and displays at remote locations where the broadcast is uniformly sent out to remote displays. The term broadcast, as used herein, includes any transmission or broadcast of signals over one or more networks or systems, such as but not limited to, a telephone network (standard, wireless, or otherwise), a cable or television broadcast system, or the Internet, regardless of whether the signal includes audio and/or video portions, and regardless of the nature or differences in transmission of signals over various systems. For example, a signal broadcast via a television broadcast system may be sent from a single location and a similar signal is received nearly simultaneously by a plurality of remote locations 12. By contrast, a transmission via the Internet may be accomplished by a blast transmission from a server to a plurality of remote client applications, periodic requests from the client applications and responses to these requests by a server, or where various clients, such as a remote location 12, obtain the transmission or part thereof in different ways. For example, one remote location 12 may receive the transmission or broadcast via a Webcast, another may employ an Internet browser for viewing a web page that is updated with the transmission in some manner, while still others may employ a client application to pull or otherwise receive all or portions of the transmission at different times and in different manners to accommodate the considerations, such as bandwidth and hardware limitations, of the systems at particular remote locations 12.

In its preferred embodiment auction site 14 comprises a location remote from at least some of the participants at which bids are accepted and the auction is controlled. The auction is controlled by an auctioneer 24 located at auction site 14. Auctioneer 24 functions in a capacity similar to the capacity of an auctioneer in a typical auction where participants are located at the auction site. Equipment to be auctioned at auction site 14 may or may not be physically present at auction site 14. Located at auction site 14 is a receiver/transmitter processor 26 which receives and transmits bid information via network 16 to and from remote locations 12. Receiver/transmitter processor 26 may include, for example, a dual-tone multi-frequency receiver/processor for monitoring DTMF signals generated by input devices 18 at each remote site 12. Additionally, processor 26 may include voice recognition technology for receiving and decoding voice input from input device 18. Processor 28 is capable of identifying and monitoring each input device 18 from a remote site 12 as well as communicating via network 16 with each remote site 12.

Additionally, processor 26 receives initialization parameters, to be subsequently described, for the auction via a terminal 30. Initialization parameters are selected by auctioneer 24 and input to processor 26 via terminal 30. Processor 26 controls a display 32 located at auction site 14. Display 32 displays information such as, for example, the asking bid, current bid, bidder identification, location of bidder, and lot number. Where the auction is conducted across national boundaries, the asking bid and actual bid may be displayed in numerous foreign currency denominations. The information generated by processor 26 and displayed on display 32 is communicated to participants at remote locations 12 via a broadcaster system 34. Broadcaster 34 may include a conventional broadcaster television system whose output is supplied via communications link 36 to network 16. Broadcaster 34 may include a conventional television system, in addition to a satellite communications system, cable network, or the like. Information generated by broadcaster system 34 is displayed on displays 20 at each remote location 12. Broadcaster system 34 may capture a live "picture" of the auctioneer 24 at auction site 14 conducting the auction and may additionally or alternately include pictures and other details of the equipment or lots being auctioned. In this manner, each participant at remote location 12 has the sense of physically being present at auction site 14 during the auction. Broadcaster system 34 further captures information displayed on display 32 for transmission to each remote location 12. In this manner, during the bidding process real-time information is available to each bidder at remote site 12 during the auction.

In another embodiment, part or all of the video feed may be provided by a managed image/video display automated and activated (with timing tweaks available as well in some embodiments) by a control panel. In one version of this embodiment, a storage disk or directory containing digital pictures, and potentially digital videos, is set up. One of the stills or videos is identified as the starting point. The system automatically starts with the first digital image, preferably staying on that image for about 4-6 seconds, and then follows through all others in the directory, preferably every about 3-4 seconds each, without having to know how many are in the directory or what the names of the images in the directory are. This system may also be used to automate lot number insertion into the images and/or the vendor logo for the specific consignor of the lot. The CHYRON (or similar device) is separately providing bidding info (e.g., model, serial number, hours) for integration into the same display. Each (the automated pictures, the CHYRON, and the live feed of the auctioneer) is a source received by the control room which may shrink, expand, swap, and/or composite the sources as desired. Further, if the pace of the displays is considered too fast or too slow, in an embodiment, the control room may use the control panel of the automated image/video display to speed or slow the progression. In one embodiment, a ticker style crawl may be added to the lower portion of the video display. This may be used to provide configuration information and selling points regarding the current item being auctioned while the other components of information are playing above it. Information provided could include the manufacturer, model, options or packages included, model year, serial number, number of hours of usage, location, and other selling points of interest.

Figure 2:
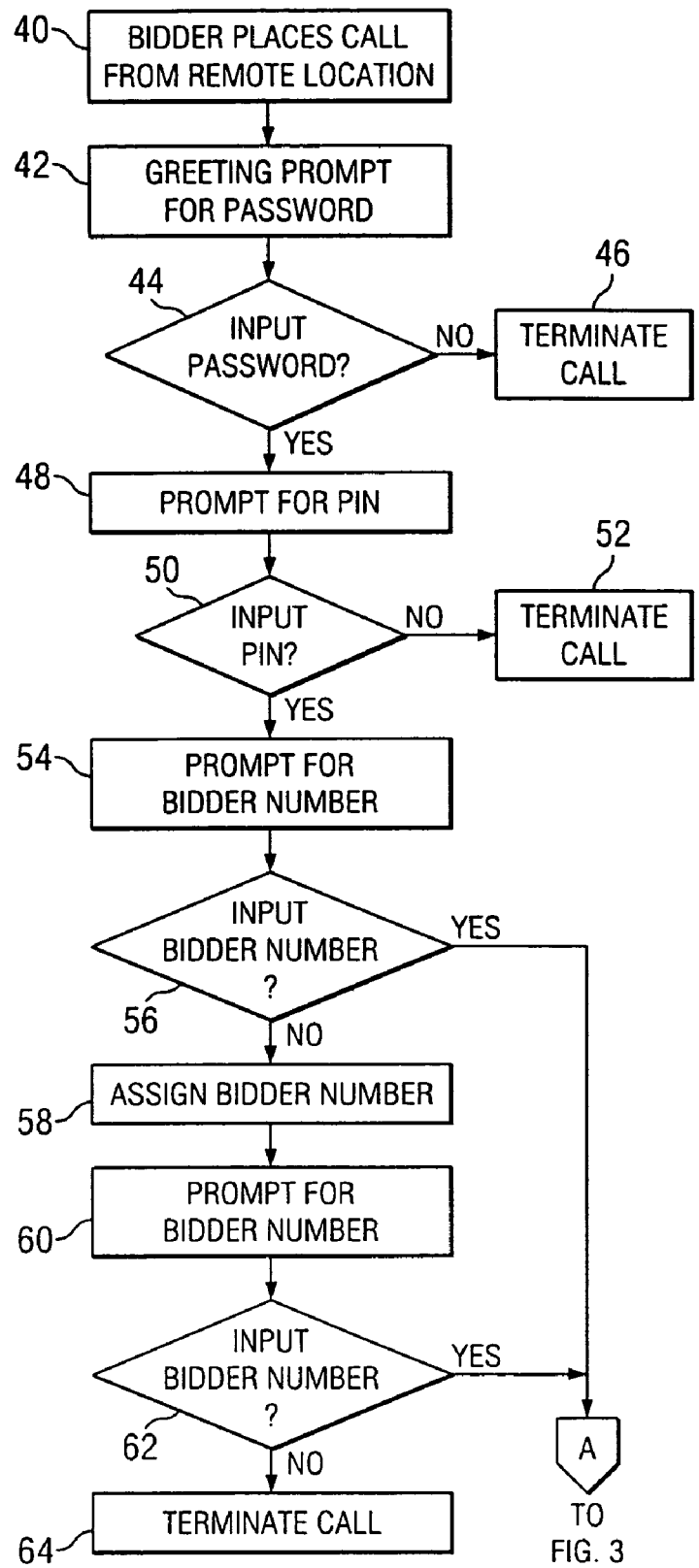
FIGS. 2-4 are flow charts illustrating the overall process of the present system.

Referring now to FIG. 2, prior to commencement of the auction, communications paths are established between each remote location 12 and the auction site 14 via network 16. For example, a bidder at remote location 12a places a telephone call to the auction site 14 using a telephone input device 18. A bidder may call a 1-800 telephone number to auction site 14 at step 40, thereby establishing a communications path via link 22a, network 16, and link 28 to receiver/transmitter processor 26. Acknowledgment of the call to the participant at location 12a is made by processor 26 by generating a greeting to the participant and a prompt for the participant's password at step 42. Upon hearing the prompt, the participant inputs a password utilizing input device 18. A decision is made at step 44 by processor 26 to determine whether the password has been correctly input by the participant. If no password has been input, the telephone call is terminated by processor 26 at step 46. If the proper password has been input and received by processor 26, processor 26 prompts the participant at remote site 12a for a personal identification number (PIN) at step 48. The participant then enters the participant's PIN number through input device 18. Processor 26 then determines at step 50 whether a proper PIN number has been received. If no proper PIN number has been received, the telephone call is terminated at step 52. If the PIN number has been received, processor 26 prompts the participant for the participant's bidder number at step 54. Processor 26 then determines whether a proper bidder number has been input by a participant at step 56. If the bidder number has been entered and accepted, the process continues to step 70 (FIG. 3).

If processor 26 determines that no correct bidder number was input from a participant at remote location 12a, processor 26 assigns a bidder number to the participant at step 58. Processor 26 then prompts the participant for a bidder number at step 60. The participant then inputs the newly assigned bidder number and processor 26 determines if the bidder number has been input at step 62. If no bidder number has been input, the telephone call is terminated at step 64. If an acceptable bidder number has been input at step 62, the process continues at step 70 (FIG. 3).

At this point, prior to commencement of the auction, each participant at remote locations 12 are linked via network 16 to auction site 14. Processor 26 continuously monitors each input device 18 at remote locations 12 as well as transmits data to each remote location 12 over the established communication links. Prior to commencement of the auction, data such as, for example, sales information, auction messages and instructions, previews of "for sale" assets, and music may be transmitted to each remote location 12.

Figure 3:
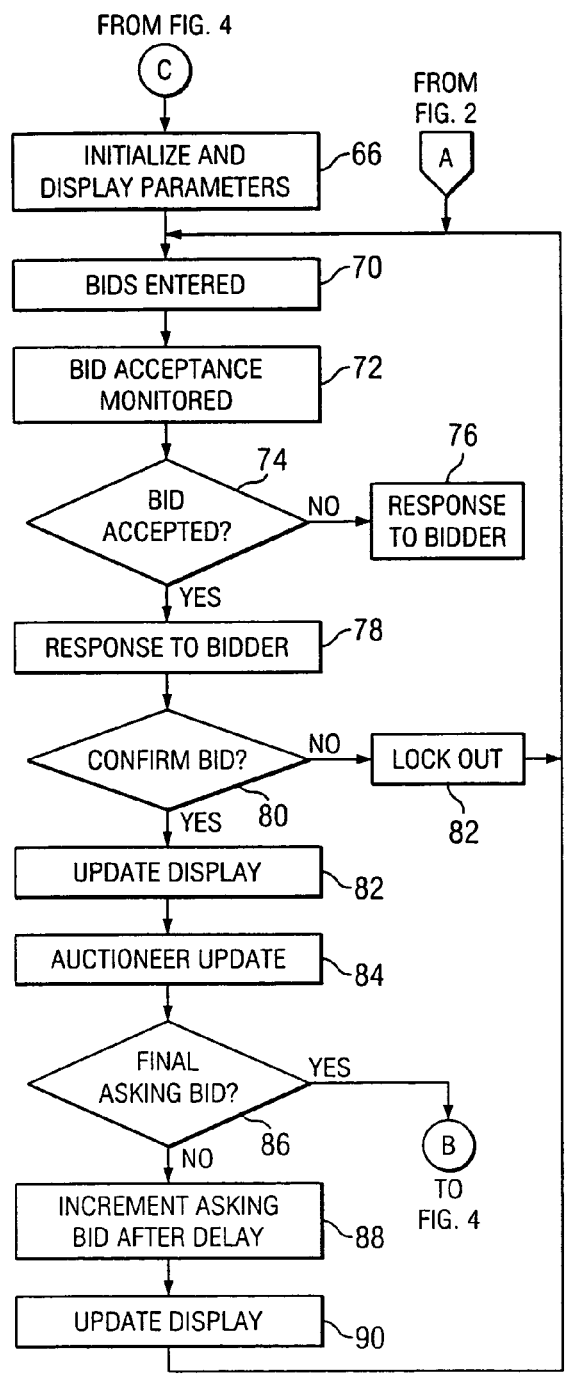

Referring now to FIG. 3, prior to commencement of an auction, various parameters are initialized and displayed at auction site 14 at step 66. Auctioneer 24 via terminal 30 inputs to processor 26 data relating to a lot number, the initial asking bid, a predefined increment, and foreign currency conversion factors for currency denominations for the remote locations participating in the auction. This information is utilized by processor 26 to generate data for display 32. Display 32 in turn provides data to broadcaster system 34 which communicates the information on display 32 via communications link 36, network 16, and communications link 22 to displays 20 at remote locations 12. Therefore, prior to commencement of the auction of each lot, each participant possesses information relating to the lot number, asking bid and its equivalent in any foreign currencies involved in the auction. Throughout the auction, display 32 is updated to reflect actual bids made during the auction (and may further include the amount required to displace the last bid) such that each participant at a remote location 12 participates in real-time at the auction and has current bidding information. The effect of the "real-time" display and participation is that while some minimal communication/calculation delays may be present, participants will be able to effectively interact with and see current information on the auction process as if the participants were actually present at auction site 14.

In an alternative embodiment, broadcaster 34 or an alternative device may, in addition to providing audio over the broadcast network, also provide audio of the broadcast back down the component of network 16 connecting to individual input devices 18. In this embodiment, the system delivers audio of the event over what is a telephone line and has it run in background only to be superceded by the IVR system. Accordingly, a buyer need not be watching a video broadcast to participate and can conceivably receive his reminder from the IVR system on a cell phone or other phone not in proximity to a video signal. By following the auctioneer's chant the buyer may, if he wishes, bid based only on the audio information from the auction. This may be less desirable for bidders as it requires special attention to the auction chant. This audio feedback may be the full audio of the broadcast or may be selected audio from the broadcast conveying critical information. There may also be latency issues, as the latency of the input devices may have a different or much shorter latency than the latency of the broadcast network. In such a case, the sound sent down the network to the input devices may be delayed so that it arrives in the input device at the remote location 12 in sync with the audio from the broadcast. In one embodiment where the broadcast network is a television broadcast over a satellite, the audio can be delayed to have it experience the same latency as the broadcast (level playing field concept) by taking the audio off of a receiver carrying the satellite signal. This technique can help ensure that the same audio information arrives at the same time to avoid confusion. Note this inherent latency issue for synchronizing broadcast with another component of the network is distinct from the latency management and the programmed delays before accepting bids discussed later in this disclosure. In an additional alternative, the audio signal may be delivered over the network without latency adjustment whereby it arrives almost instantly by using the auction sound system as the source. This alternative could be particularly useful where a bidder at the auction site itself wishing to bid by telephone would receive the unadjusted audio, while remote bidders relying on the broadcast receive delayed audio synchronized with the broadcast.

Another alternative method of controlling the audio delay is the use of a delay pedal such as is commonly used with electric guitars or a similar device. Such a pedal may be used to dial in a specific delay (for example a delay of between 0 and 2.8 seconds). In one example, a specific company providing broadcast services was experiencing an additional delay of approximately one second. To synchronize the audio signal being sent to individual telephones to match the broadcast signal from that supplier, the guitar pedal (also referred to as a delay device) could be set to one second delaying the telephone audio feed that amount. While guitar pedals are typically analog controlled devices, a digitally controlled delay device could also accomplish the same goals. Additionally, if a delay device was placed in the loop, in the event that unexpected or new delays in the broadcast or other signal were occurring, the device could be used to "dial-in" (particularly on devices with analog controls) the delay on the fly until synchronization is achieved.

An additional parameter that is initialized is the duration or cycle time during which bids are accepted. This parameter may also be adjusted by auctioneer 24 during the auction. This duration or cycle time parameter affects the amount of controlled or programmed time delay between broadcasting a new asking bid and the system beginning to accept bids at the new price. It creates a bid acceptance window which starts only after the controlled delay has elapsed and ends with the first accepted bid. As discussed immediately above, and in greater detail below, the opening of this window is modifiable by the auctioneer, both before (and, in some embodiments, during) an individual auction, by varying or adjusting the amount of the controlled time delay.

After initialization of the system, processor 26 begins accepting bids at step 70 from the participants at remote locations 12. Participants at locations 12 generate bid acceptance signals by utilizing input devices 18 such as, for example, by pressing the "#" symbol key on a keypad of a telephone input device 18. Those participants not wishing to enter a bid do not touch any key on the telephone. Where processor 26 includes voice recognition capabilities, a participant may indicate acceptance of a bid by speaking into input device 18 such as "yip." Processor 26 continuously monitors communications link 28 for input bids at step 72.

Processor 26 determines at step 74 whether a bid has been accepted. If a participant's bid has not been accepted, a response is generated to each participant whose bid has not been accepted at step 76. The response may include a predetermined tone generated by transmitter 26 such as, for example, a "honk" sound or the words, "Bid not taken, please bid again," communicated to a participant through device 18. If a bid has been accepted, a response is generated to the participant at step 78 such as, for example, by generating a tone at transmitter 26 in the form of a "beep" sound, the sound of a cash register ring, or the words "bid taken" indicating to the particular participant at a remote location 12 that the bid has been accepted. In the most preferred embodiment, audible reinforcement of "bid taken" is provided to the new high bidder each time a bid is captured. In an alternative embodiment, an additional feature may provide that the bidder whose bid has just been displaced is advised that he or she is no longer high bidder by issuing an audible "you're out" each time his bid is displaced by a higher bid. Both of these audible reinforcements are preferably sent by way of the network to the appropriate corresponding individual input devices 18, although audible tones reflecting that each new bid has been accepted may also be provided over the broadcast network as well. As additional insight, interactive voice recognition (where "tone" recognition is a recognized subset of "voice" recognition) features traditionally provide a one-to-one response to active input from a specific phone or other input device returned to the specific input device, and broadcast traditionally enables general feedback to all or many input devices based on input from a specific input device. The current embodiment provides one to one feedback (you're out or the like) to a specific input device (the previous high bidder) based on input from a separate specific input device (the new high bidder). Hence, in this embodiment, when a new bid is accepted from a first input device, not only does the system provide a unique feedback to the first input device (i.e., bid taken), the system provides unique feedback to a second input device which had the previous high bid (i.e., you're out), as well as a broadcast to all input devices (i.e., yip). Note also, that with respect to all literal feedback provided by the system, in some embodiments the bidder registration process may include a field for primary language and the feedback may be provided in one of multiple languages chosen by or for the bidder. The present system is operable, in some embodiments, to transmit and receive information and signals in multiple languages, whether by standard or wireless telephone, radio systems or phones, television transmissions and computer communications, such as via the Internet or otherwise.

In one embodiment, as noted briefly above, audible tones reflecting that each new bid has been accepted may also be provided over the broadcast network as well. This could be provided over the broadcast network, broadcast generally back to each input device, and/or broadcast to each input device which is not the current or last high bidder (as these input devices may be receiving specific feedback as described above). One potential approach for reflecting that a new bid has been accepted would involve the use of recorded or generated voice "yips." Different voices or yips could also be used to simulate the feel and excitement of an in-person auction, where yips from bid spotters signal receipt of new bids from the audience. Different yips could be used on successive bids taken in a straight cycle, on a randomly generated basis, or specific yips could be associated with a specific bidder or group of bidders for a single auction (not only providing a similar feel to an in-person auction, but also similar feedback where the same bid spotter tends to catch bids from the same bidder or group of bidders in an in-person auction). The auctioneer may also be provided a separate control to turn up the volume on the audio feed of yips leading to him or her as compared with other audio sources he or she may be hearing. This would enable the auctioneer to move the auction forward based on the audible response of the yips rather than having to rely on a computer screen or video monitor (again, simulating the more traditional in-person auction, only in this instance to assist the auctioneer, who most likely has primary experience in the traditional environment). This simulation of the auctioneer's more typical experience may enable the auctioneer to achieve more natural pacing and better control of the energy of the auction. Bids from remote bidders, using telephones or computers for example, may have different tones as well, allowing the auctioneer and, in some embodiments, the audience also, to better determine where the bid originated.

In one alternative embodiment at step 80, a decision is made to determine whether the particular participant at remote location 12 has indeed made the bid by seeking a confirmation. The response to the bidder at step 78 includes a prompt to confirm whether the participant made the bid. The participant may actuate a key on a telephone keypad (such as the "*" key) at input device 18 to confirm the bid. If the bid is not confirmed, a subsequent prompt may be generated to the participant or the participant may be routed to a help desk number, but after a predetermined time, if no confirmation is received, the participant may be locked out of participating in the next bid cycle at step 82. In the preferred embodiment, step 80 may be bypassed to increase the pace on the assumption that the already screened participants are sincere. In this event, in the most preferred embodiment, only the winning bid is confirmed as in step 102 below.

Assuming that confirmation has been received (or alternatively bypassed) from the particular participant that a bid has been made, display 32 is updated at step 82. Display 32 generates the current bid, the location of the bidder, and bidder identification. Auctioneer 24 is also provided with bid acceptance information at step 84. This bid acceptance information may include the generation of an audible prompt (which may be heard by the auctioneer) each time a bid arrives at the auction control panel to prompt auctioneer to move to the next increment. At this point in the bidding process of the auction, each participant receives real-time information acknowledging bid receipt and the present status of the auction. All participants in the auction preferably know the location of the bidder, the amount of the accepted bid in the participant's currency value, and the bidder identification number of the accepted bid.

Figure 4:
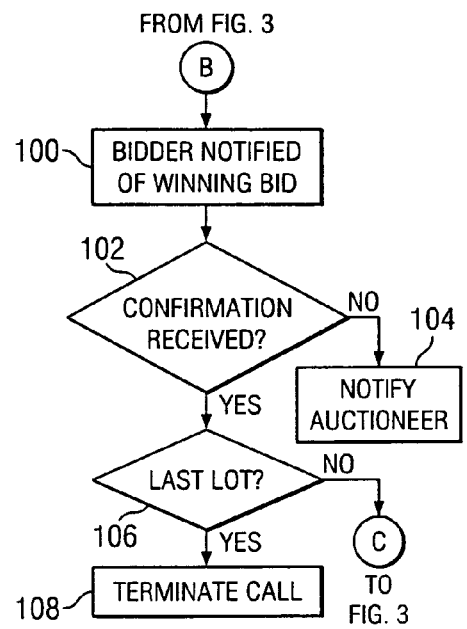

A decision is then made by auctioneer 24 at step 86 as to whether the accepted bid was the final asking bid for the lot. If the decision is yes, the process continues to step 100 (FIG. 4). If the bid is not the final asking bid at step 86, the asking bid is incremented in accordance with the predetermined increments established at initialization at step 66. The asking bid is then incremented at step 88 and display 32 is updated at step 90. Additionally, the new asking bid can be adjusted in real-time (either by direct input or by adjusting the automatic increments up or down as appropriate) by auctioneer 24 as the bidding approaches the final bid and subsequent close and sale. The new asking bid is subsequently communicated to participants via broadcaster system 34. The asking bid is incremented and a programmed delay (initially the delay may be predetermined by the auctioneer and input as part of the initialization) is incorporated into processor 26 before processor 26 begins accepting subsequent bids from participants at locations 12. In this manner, processor 26 controls subsequent bid acceptances to prevent overrunning of system 10 and establishes a bidding acceptance window of time. The delay is adjustable by auctioneer 24 based upon the particular bidding environment and aggressiveness of participants. After display 32 has been updated with current bidding information, the controlled or programmed time delay elapsed, new bids are then accepted at step 70. The process continues as asking bids are incremented and accepted until the auctioneer determines that the final asking bid has been accepted at step 86, and the process continues to step 100 (FIG. 4).

Auctioneer 24 may provide a warning that the current bid is about to be accepted as the winning bid. The warning may be communicated through audio feedback (such as a drumroll) or video feedback (such as a flashing bid amount or change in color of bid amount) in display 32. Acceptance of the final bid by auctioneer 24 may also generate a real-time response in the display 32 such as a cymbal-crash or visual acceptance signal with the accepted bid amount. With the acceptance of the final bid, the auctioneer blocks or locks out all participants but the winning bidder and proceeds to the confirmation process with the winning bidder.

Referring now to FIG. 4, with the acceptance of the final asking bid, the last bidder is notified that the final bid is a winning bid at step 100. Processor 26 notifies the winning bidder and prompts the winning bidder to determine a confirmation at step 102. In one alternative embodiment, the bidder may be forwarded to a help or administration desk to confirm the purchase orally over the phone. At this time a recording could be made which provides back-up of the bidder's full intent to purchase. Additionally, at this point, or even on initial login, voice printing of buyers for security could be used in lieu of a password. Telephone based systems allow unique identification of voice prints and the ability to record, verify and use that voice print as absolute confirmation the buyer is who he says he is. If confirmation is not received, a notice is provided to auctioneer 24 at step 104. Auctioneer 24 will then provide subsequent instructions to terminal 30 for communication to the winning bidder.

If confirmation is received at step 102, a decision is made at step 106 to determine if the previous lot was the last lot in the auction. If the decision is yes, the call communication path between remote locations 12 and auction site 14 is terminated at step 108. The auctioneer may also choose to reopen bidding to the entire audience at the level of the previous bid. The confirmation of purchase eliminates doubt that the buyer wanted the item just as holding up a paddle or buyer number or signing a ticket at a live sale does in an auction room. From time to time the high bidder backs out pleading confusion or an error in his understanding of price. When this happens one preferred embodiment of the system provides for an automated backup function which takes the auction back electronically to the last underbidder's bid amount and identity where the auction may continue. If there is no more action, then the sale may be completed to the underbidder. If subsequent lots are to be auctioned, the process continues to step 66 (FIG. 3) and new parameters are initialized and displayed for a subsequent lot to be auctioned.

In a preferred embodiment, during the bidding process, processor 26 maintains an audit trail of each participant's response, as well as whether the bid is accepted or not.

Figure 8:
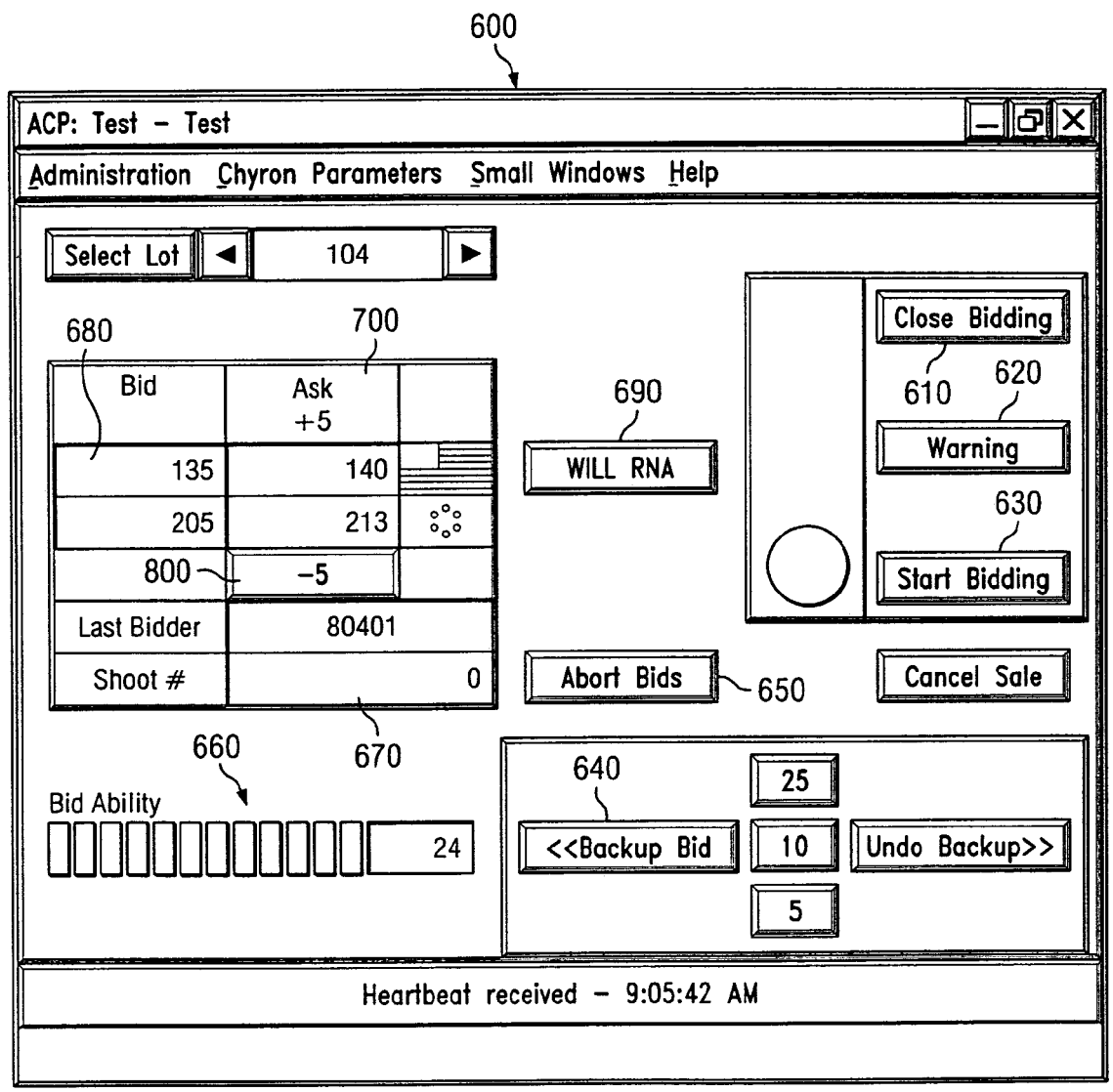
FIG. 8 is a screen shot of an embodiment of the auction control panel interface during a simulated auction.

While the embodiment described above refers to actions taken by the auctioneer 24, in the most typical example, these actions are taken by an auctioneer's clerk instead of the auctioneer themselves. The description, in general, is intended to reflect the auctioneer or a clerk within immediate communication working in concert with the auctioneer. For experienced auctioneers, it is often preferred to let the clerk handle many of the computer details, while the auctioneer focuses on the progress of the auction as a whole and the energy associated therewith. This allows the auctioneer to spend more focus gathering information and calling the auction and less taking actions on a keyboard or screen. However, some embodiments may use certain separate and/or duplicate controls for the auctioneer, such as, for example, a wireless pad with a set of large clearly labeled buttons, to reduce potential conflict if the clerk and the auctioneer are not in precise synchronization. One embodiment fulfilling such a purpose is illustrated in FIG. 8 showing an auction control panel interface 600. For example, the auctioneer is preferably provided with a control to allow the closing of the sale for any particular auction of an item. This could be by means of a keyboard, a button on a touch screen computer, or even a physical button or switch to be physically pushed by the auctioneer, for example, a button which the auctioneer hits when tapping his or her gavel to close the sale. In one embodiment, both the auctioneer and the auctioneer's clerk would have a button to close the sale, in a different embodiment, only the auctioneer personally could close the sale. Such a control could also be provided by auction control interface 600 through a software button 610. A button to transition to a warning state before bidding closes could also be provided through a software button 620. In either event, with the auctioneer able to close, the possibility of the system allowing a last second bid through after the auctioneer has announced sold but before the clerk has informed the system is dramatically reduced. In another embodiment, a control could be provided for the auctioneer to open an individual auction (one example would be a software button 630 on interface 600), preventing the accepting of bids while the auctioneer was still working on the build-up. While the problems with early bids are less troublesome than with bids after a sale is closed, this may still negatively impact the rhythm and pace of the auction or the auctioneer. In other embodiments, the auctioneer may be provided with a control to increase or decrease the bid increment or opening bid on the fly during, or just prior to opening, the auction (for example, by using software buttons in the box 640 on interface 600). The auctioneer may also be provided with a control to initiate the challenge bid process (for example, software button 650 on interface 600) where bidders are allowed to bid against themselves in an effort to reach a reserve price to close a sale. In one embodiment where challenge bidding is used, the auctioneer has the only control for allowing entry into a challenge bidding process, while in another embodiment, the auctioneer merely has an overriding control while the base control is still present with the auctioneer's clerk.

Additionally, separate efforts may be made to provide information directly to the screen of the auctioneer to improve their ability to pace and run the auction. In one embodiment, a bidding frenzy monitor may be provided to the auctioneer (one example illustrated in bar line 660 on interface 600). This monitor could take the form of a bar graph that rises thermometer like as activity becomes more frenetic (for example when a number of bidders are being bounced as "not taken" because their bids were not first at that price). One basis for objectively evaluating this number is reviewing the number of bids not taken by the system for each given increment. Then this number can be tracked over time. The system could display the numbers for each increment, a rolling average of the last few increments, or an acceleration number based on whether the numbers are increasing or reducing from increment to increment. Another measure of bidding frenzy could also track how many bidders are left who are either bidding or having their bids not taken. This could be reflected by a number or bar shown to the auctioneer or it could be incorporated by algorithm with the number of bids not being taken to provide both pieces of information together in one number. Other approaches, such as tracking by computer the time between accepted bids and the change in that time, could also be used to provide the auctioneer additional insight into the "frenzy." The feedback on the level of excitement may be used by the auctioneer to assist him in pacing of the auction and his call, to assist him in evaluating when and how much to change the bidding increment, and to assist in determining when to change the latency setting in embodiments where the setting may be modified on the fly. Again, this information provides the auctioneer information which helps replace some of the types of feedback experienced in a traditional live auction with a room full of all of the bidders, which the auctioneer might otherwise be losing in the interactive remote auction.

Another form of feedback which may be provided to assist the auctioneer in managing the individual auctions is a display of a shoot number (an example would be box 670 in interface 600), possibly combined with a display of the current bid (an example would be box 680 in interface 600) and the reserve or a flag that the reserve has not yet been attained (an example would be the flag 690 "Will RNA" in interface 600 which displays when the reserve has not yet been met). While the interface 600 illustrated in FIG. 8 does not directly display the reserve, but only the flag 690, other embodiments display either the reserve only, often near the shoot number 670 if present, or both the reserve and the flag 690. The shoot number may be gathered from a summary of results of the last 3 months of public auctions of similar lots, or may otherwise be developed as a rational target figure for market price for the lot being auctioned. Since reserves do not always reflect reasonable assessments of the market, the instant feedback of the shoot number as compared to the current bid to the auctioneer while he is managing the auction, may provide him insight into how hard he should be pushing or delaying to try and improve the price on an item or when it might be better to close out and move on to the next item for improved pacing of the auction as a whole. The shoot number may also be provided as a range or set of ranges and may be displayed graphically instead of numerically, with a band of ranges and the rising current bid moving in and out of various ranges with the reserve price as a threshold range also illustrated.

Figure 5:
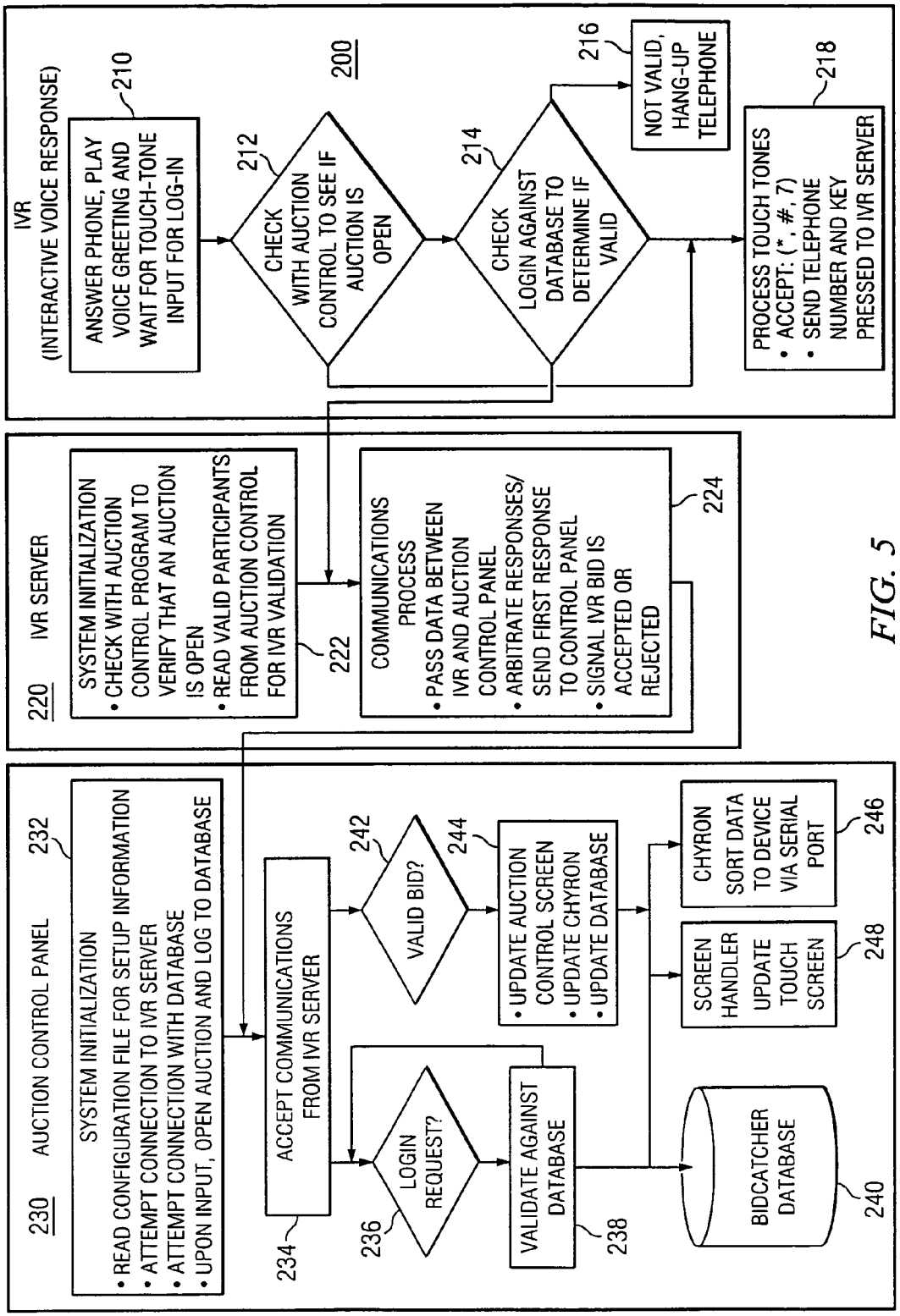
FIG. 5 is a block diagram illustrating one group of components of an embodiment of the present system.

FIG. 5 diagrams three components of the network software for the preferred embodiment of the present disclosure, the IVR System 200, the IVR Server 220 (also referred to as the teleserver 220), and the auction control panel 230. In step 210, IVR System 200 answers the phone and asks for a PIN and password using a phrase such as "Welcome to the Bid-Catcher Live Auction system. To login, dial your Bidder ID number, then press the pound key." Upon receiving a touch-tone in response to step 210, in step 214, IVR System 200 checks the received touch-tone login against database 240 by way of communications process 224 on IVR Server 220 to communications process 234 on auction control panel 230. If information in step 214 matches the database, then IVR Server 220 accepts the password and so advises the caller. If information does not match, it encourages the caller to check for correct entry. If after three tries it does not receive an entry which matches the password, it then routes the caller to a live help desk or, in some embodiments, disconnects the caller in step 216.

Assuming a favorable password is entered in step 214, IVR System 200 then checks to see if an auction is open in step 212. IVR System 200 checks with auction control panel 230 to see if auction is open (connection not shown). If the auction is open, then IVR System 200 hands over the call to IVR Server 220 and establishes direct communication between the caller, IVR Server 220, and the auction control panel 230. The caller may participate in the auction through touch tones, which are processed by the IVR System 200 in step 218.

IVR Server 220 has two primary components: initialization process 222 and communications process 224. Initialization process 222 does check database 240 to verify that password and ID are valid, it then checks to see whether an auction is open and bidding has been enabled. IVR Server 220 checks ID by communicating with auction control panel 230 by way of communications process 234. Auction control panel processes the login request in step 236 and validates against database 240 in step 238. Similarly, the database 240 preferably contains the information on open events which may be searched to see that a requested auction has been enabled.

IVR Server 220 initializes for a given auction in initialization process 222 by checking with auction control panel 230 to verify the open auction and read the valid participants from auction control panel 230 for IVR validation. IVR Server 220 maintains an ongoing communications process 224 which passes data between IVR System 200 and auction control panel 230. Communications process 224 arbitrates responses and sends the responses in order of priority to the auction control panel 230. Communications process 224 on IVR Server 220 similarly responds to each bid request passed through IVR System 200 to signal a response of bid accepted or bid not taken.

Auction control panel 230 initializes for a given auction using initialization process 232, whereby the auction control panel 230 reads a configuration file for setup information, connects with IVR Server 220, and connects with database 240. Based on input through the auction control panel 230's interface, the initialization process opens the auctions and logs to the database. Input through the interface to auction control panel 230 may also set or modify various parameters either before or during the auction as described above and below. Login steps 236 and 238 are as described above. As bids are communicated to communication process 234, auction control panel 230 checks that the bid is valid in step 242. In the preferred embodiment, auction control panel 230 makes the decision of when the controlled time delay has expired and refuses to accept a valid bid before that time. In an alternative embodiment, IVR Server 220 could be signaled when the bid window has opened and will through its communication process 224, only send the first bid after the delay has expired and the window is opened. Once a valid bid is accepted in step 242, auction control panel, in update process 244, updates the auction control screen using screen handler 248, updates the video graphics generator (such as a video/television graphics generator marketed under the trademark CHYRON) 246, which is producing the broadcast of the auction to monitors at the auction and in remote locations or sites, and updates the database 240. Database 240 may also contain information about the lots and reserves for the lots and other administration for running the auction. Database 240 may be modified by the auctioneer or auctioneer's clerk to make adjustments to this administrative information to account for last minute changes relating to the lots to be auctioned.

Figure 6:
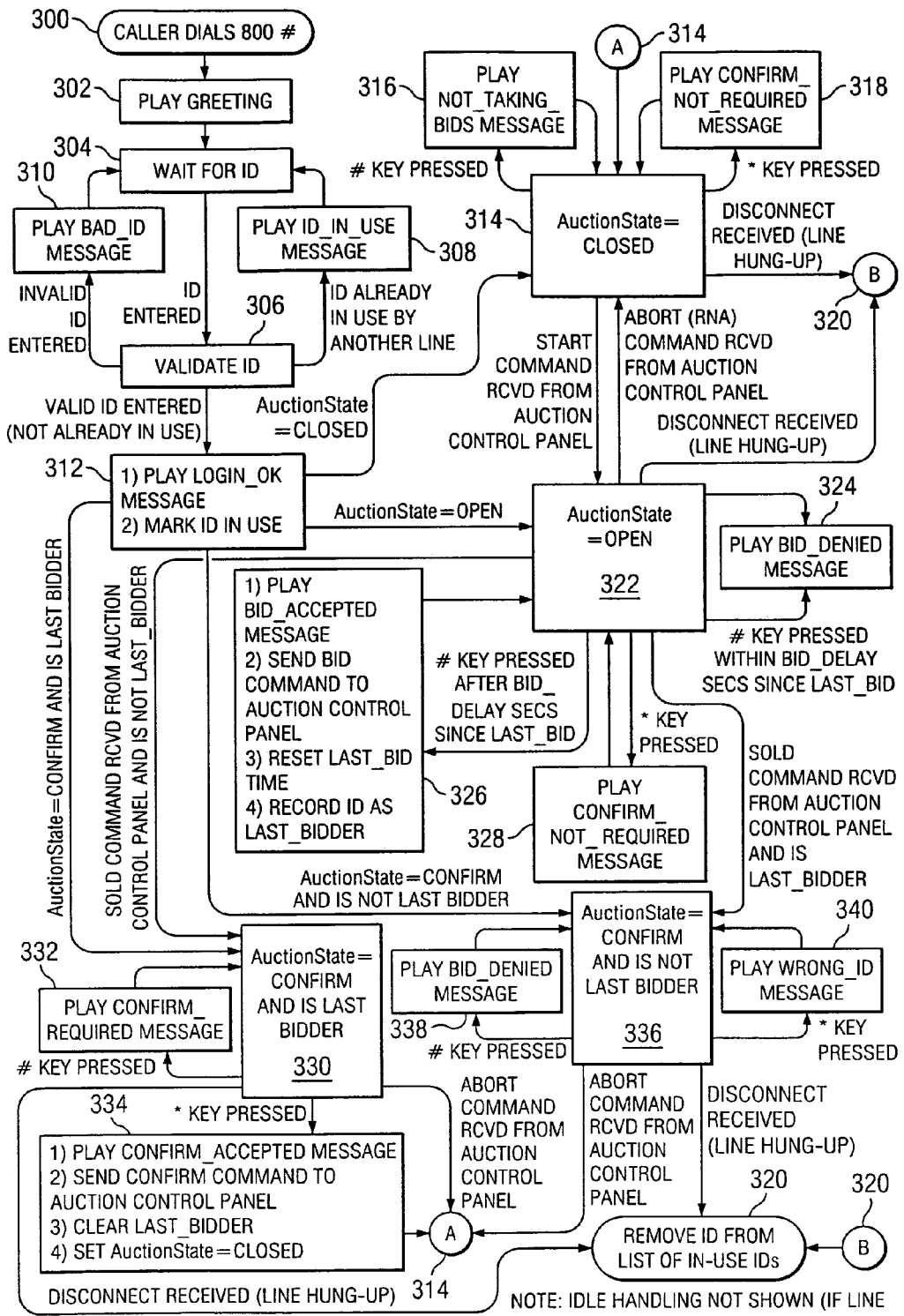
FIG. 6 is a block diagram illustrating the interactions at the phone user interface of an embodiment of the present system.

FIG. 6 provides a diagram and flow-path of typical interactions between the bidder on the phone (the caller) and the system of a preferred embodiment of the present system from login through confirmation or disconnect. In step 300, caller dials-in, preferably by dialing a toll-free access number. In response, in step 302, the system plays a greeting back to the caller such as "Welcome to the BidCatcher Live Auction system. To login, dial your Bidder ID number, then press the pound key." The system waits for the caller to enter an ID in step 304. After the caller enters the ID, preferably using touch tones, but alternatively with voice commands, and even with voice identification software for added security interpreted by an IVR component in or working with the system, in step 306 the system validates the ID. If the ID is already in use, then in step 308 the system responds to the caller "I'm sorry, but that Bidder ID is already in use" and returns to wait for a different input. If the ID is invalid or not recognized, then in step 310 the system plays a message such as "I'm sorry, but that Bidder ID is not recognized," or "I'm sorry, but I didn't get your entry," possibly followed by "Please refer to the Bidder ID number that was provided to you and dial that number now, then press the pound key." Step 310 then returns to wait for a different input. Although not shown, after a set number of failures, the system in some embodiments may play a message like "I'm sorry you're having trouble. Please contact our help desk at the number shown in your catalog. Goodbye," and then disconnect the caller. Alternatively, after a set number of failures, the system could automatically route the caller to the help desk.

If the ID is validated, then in step 312 the system plays a login ok message and marks the ID to be added to a list of in-use IDs. Step 312 also involves checking the state of the auction to be able to properly respond to any inputs from the caller. When no auction is active at all it may play a message like: "There are currently no auctions being held. If you have any questions or you'd like information about the BidCatcher Live Auction System or the next auction, please call _____. That number again is _____. Thank you for calling. Goodbye," and then disconnect the system.

If auctions are available the system may play a message like "Thank you! You are now logged into the BidCatcher system. <pause> To bid, press the # key on your telephone keypad. If you are the winning bidder, press the star key when you're asked to confirm your purchase." When a key is activated by the caller, the system then checks or rechecks the auction state. If the auction is closed it moves to state 314. If the # key has been pressed, then in step 316 the system may play a message like "Bids are not being accepted at this time. Please wait until we open for bidding on the next lot." The system then returns to the auction state 314. If the star key is pressed, then in step 318 the system plays a message indicating that confirmation is not necessary and returns to auction state 314. Finally, if a disconnect is received (the phone is hung up) then the system goes to step 320 and removes the ID from the list of in-use IDs. When the auction is started and the start command received from the auction control panel, the auction state moves to state 322 or the open state.

If the auction is open in state 322 and the star key is pressed, then in step 328 the system plays a message indicating that confirmation is not necessary and returns to auction state 322. If a disconnect is received (the phone is hung up), then the system goes to step 320 and removes the ID from the list of in-use IDs. If the # key is pressed, the system checks to see if the bid window is open. While illustrated here with the delay before opening the bid window as being the amount of time since the last bid, this is merely another method for accounting for the delay. The preferred method for the delay is the number of seconds since the new asking bid was broadcast. However, since the time from the entry of the last bid and broadcasting of the new bid is virtually instant and does not involve a communication delay (with all of this gap between entry of last bid and broadcasting new bid taking place within the auction control system), defining the time as the delay from the last bid has, as a practical matter, the same effect as defining it as the delay from the broadcast of the new asking bid, and for the purposes of this application, the two alternatives will be considered equivalent. Similarly, other minor events in that sequence occurring within the auction control system could also be used as the benchmark for the start of the delay and (with differences in the hundredths of second range or less) will result in equivalent results within the spirit of this disclosure and its claims. In any event, if the # key is pressed within the delay window (the period of controlled time delay time after the broadcast of the new asking bid before the new bid acceptance signals will be accepted), then in step 324 the system will play a message like "Bid not taken." If the # key is pressed after the programmed delay has run and the bid acceptance window has opened, then in step 326 the system will play a message like "Bid accepted", send a bid command to auction control panel 230, reset last time bid, and record the ID as last bidder in data base 240.

The cycle of accepting new bids in the auction open state continues and repeats until a sold command is received from auction control panel 230 which moves the state to state 330 if the bidder is the last bidder and to 336 if the bidder is not the last bidder.

If the caller is the last bidder, then the caller alone in state 330 receives the message "You are the winning bidder. Please confirm your purchase by pressing the star key now." If the caller presses the # key then the caller is informed in step 332 that a confirmation is required using the star key. When last bidder hits the "*" key in step 334 the system replies "Congratulations! Your purchase is confirmed." Step 334 continues by sending a confirm command to auction control panel 230, clearing the last bidder from database 240 and changing the auction state to the closed state 314. If an abort command is received from the auction control panel 230, then the system moves to the auction closed state awaiting further instruction from the control panel.

When the sold command is received, bidders who are not the last bidder are moved to state 336. At this state other attempts to bid are rejected in step 338 with a message like "Bids are not being accepted at this time. Please wait until we open for bidding on the next lot." If other than last bidder attempts to confirm with the star key, then in step 340 a message is played like, "Confirmation is denied because you are not the winning bidder. When asked to confirm your purchase, please press the star key only if you are the winning bidder." If in state 336 a disconnect is received, then in step 320, the ID is removed from the list of in-use IDs.

After step 334 occurs, the operator of auction control panel 230 changes state to next lot and reopens for bidding, moving the system to open state 322.

Figure 7:
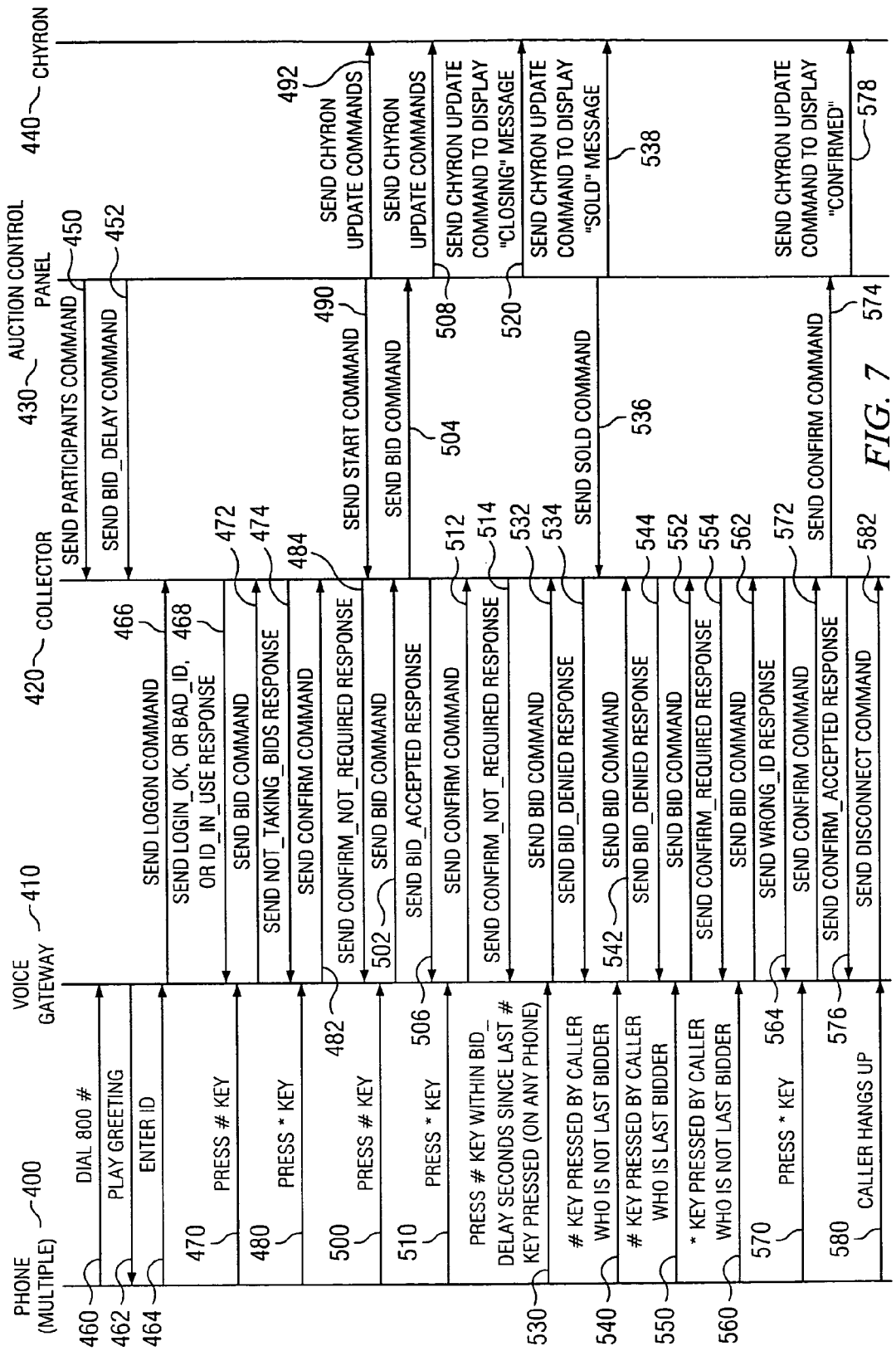
FIG. 7 is an event flow chart of various event interactions in an embodiment of the present system.

FIG. 7 diagrams several of the possible event flows in an auction run under a preferred embodiment of the present disclosure. The communicating components illustrated include multiple phones 400, voice gateway 410 (also referred to earlier in a slightly different embodiment as IVR System 200), collector 420 (also referred to earlier in a slightly different embodiment as IVR Server 220), auction control panel 430 (also referred to earlier in a slightly different embodiment as auction control panel 230), and video graphics generator 440. While only a single phone 400 is illustrated, in the preferred embodiment a large number of phones 400 will be participating in the auction, each uniquely identified. While only single voice gateways 410 and collectors 420 are illustrated, it is understood that in some embodiments multiple of such components may be present either as back ups or to more efficiently process the substantial number of inputs from phones 400.

FIG. 7 identifies a collection of sequenced events and how the various components interact to develop and maintain the events. These include: initialization in steps 450-452; user login in steps 460-468; the auction start in steps 490-492, close in step 520, and sold in steps 536-538; and various attempts to use one of the key preferred function keys (# or *) during various states in the auction in steps 470-474, 480-484, 500-508, 510-514, 530-534, 540-544, 550-554, 560-564, 570-578, and 580-582.

Other alternative functions not illustrated may include a reminder (if idle longer than X seconds the IVR plays reminder). For example, in one embodiment, every 120 seconds the system plays the following to remind caller that system is still alive: "The BidCatcher system remains open for your bids. <pause> To bid, press the # key on your keypad." While only the # and star keys are married to bidding responses, the other functions are available for other purposes. In the preferred embodiment, the use of the zero key routes caller to a live help desk. This is accomplished manually by touching zero or automatically after three successive failed attempts to register. As discussed above, automatic forwarding could also happen in response to a successful bid to get in-person confirmation (preferably with an audio recording of the conversation) over the telephone by the help desk. Other assistance functions could be attached to other keys such as the "7" key routing to a credit person or the "9" key routing to a transport person.

In one alternative embodiment, the credit of the remote bidders may also be tracked and monitored. On registration to become a bidder, a credit level or limit may be attached to the user ID of the bidder. The system could then monitor their bids and total won auctions for that ID and prevent the bidder from bidding beyond their credit limit. The system could also automatically route a telephone call to the live help desk or alternatively a credit desk when the bidder reaches his or her credit limit. Finally, the system could automatically route all buyers to a credit desk after purchase to ensure no unexpected credit difficulties. In another embodiment of the present disclosure, a website or other access gateway may be provided to allow consignors and/or buyers to receive live on-the-fly reports of their sales and purchases at the auction and of their relative position with respect to their credit line. It could, for example, show reports of where a buyer stands with respect to their credit line (and possibly a button to request a line increase as desired). It could also show how much a consignor had sold, how much a buyer had spent, and the net cash position (including both purchases, if any, and sales, if any) of an entity that is consigning or buying or both. In this manner, the entity's credit line may be adjusted either positively to reflect sales of consignor's goods, or negatively based on entity's purchases. This allows the entity to take full advantage of its credit limit at the auction, which promotes more aggressive and/or competitive bidding.

In another alternative embodiment, the system may be set to dial-out to a bidder requesting notification when a specific lot is coming up for auction. The system follows the progress of the auction and calls the bidder "x" lot numbers (preferably at least 3 lot numbers ahead, but possibly more depending on the anticipated speed of the auction) prior to the one he has selected. It reminds him he asked for a call, that his desired lot # will sell soon, asks for his password, and then starts the process at 304. The buyer is bid enabled when he satisfies the system that he is authorized to bid. With this type of automated calling of individual bidders just prior to sale of previously identified lots, they needn't watch the entire broadcast yet can be certain to be "present" when their areas of interest are to be sold.

One minor embellishment in auctions of the type addressed by the present system is the function "choice and privilege or pick and choose". With multiple similar almost identical items, the auctioneer groups the like items and then allows the high bidder the privilege, but not the obligation, to select as many and whichever items in the group and acquire each of them for the same high bid. One embodiment of the present system automates the choice and privilege function by special code fields in the database 240 that enables the system to group certain lots together for sale. Any time choice and privilege applies, the high bidder confirms his high bid in the usual fashion (* key) and is automatically call forwarded to the auction clerk on the auction stand. The clerk asks him for his choices, announces sale of those items, hangs up, and the high bidder returns to his prior status as bid enabled. The auctioneer asks for others who want any of the remainder for same money. The first bidder to hit the # key after the window opens wins the next sale of the remaining items in the group. The *key confirms and they too are routed to clerk for repetition on remaining lots in the group. If no # key is entered, then the auctioneer resells the remaining lots with choice and privilege by restarting the auction cycle for the remaining lots in the choice and privilege group.

Another common embellishment on this type of auction is the presence of a reserve or minimum accepted price for a lot. In a preferred embodiment, the system may accommodate this feature by looking at the database to determine if the seller placed a minimum selling price on the lot after closing the sale but before asking for confirmation and before accepting confirmation. If no minimum exists or if the minimum is below the final bid, then the item proceeds to confirmation and sale. If the minimum or reserve is greater than the highest bid at time of closing, then the system will not allow confirmation, and in the preferred embodiment it will display a graphic "RNA" for reserve not attained and will transmit an audio message over the IVR system which says, "Reserve, not attained." The system would then move to a closed state waiting for instruction from the auction control panel.

In one embodiment for dealing with reserves, particularly where a particular auction item is not apparently going to reach its reserve, consignors are given the ability to change the reserves on the fly. This may be provided through a number of techniques. In the event that after or during observing the course of earlier auctions of similar lots, the consignor makes a decision to modify the reserve on their own lot prior to commencement of the auction for that lot, they may call the help line to change the reserve by hand ahead of time. In another embodiment, the IVR system may be used for changing the reserve on the item when it is actively under auction, providing the ability to remotely lower the reserve without human intervention by anyone but the consignor and without interrupting the auction process during the course of an active auction. One approach would involve the consignor calling in on a separate line to remove or modify a reserve, while another approach would allow the consignor to control the reserve from the same line used for bidding. This would allow the consignor who is also bidding on other lots in the auction to simply call in on one line and stay on that line to handle both functions. In one simple embodiment, the consignor may simply hit two keys (for example * and then 1 or preferably similarly positioned buttons which have some degree of separation on the keypad to reduce accidents, even on opposite ends of the key pad in some instances) to release the reserve if the consignor is satisfied with the level the bidding has reached at that point. In this embodiment, once both keys are hit in sequence, the reserve would be lowered to the current bid (or, less preferably, it could be removed entirely) and a notification sent to the auctioneer of the changed reserve. By lowering to the current bid rather than removing, the consignor is protected from a sale at an unintentionally lower price in the event there are bid retractions or other reasons the bidding might be wound backwards before closing. More complex embodiments might have more detailed control of the reserve, but often the simpler more foolproof approach is preferable.

In another embodiment of the present disclosure, the website or other access gateway discussed above with respect to credit and sales status may also be provided to allow modifications with respect to reserves and proxy bids. For example, a consignor may be allowed to drop the reserve on a consigned item prior to commencement of the auction on that item through use of a web-based system. This would preferably supplement, rather than replace, the above-discussed call to the help desk to drop the reserve. Once the item's auction has commenced, then the approach described in the paragraph above would be used to ensure timeliness of the response. The website or a similar access gateway could also be used to establish proxy bids on items. This could either be done before the day of the auction, in some embodiments even the day of the auction, but before the item itself has commenced its auction, or in less preferred embodiments it could be accomplished anytime prior to closing of the auction of the item. The last choice imposes more risk that the auction will close before the new proxy makes it into the primary system and would be less preferred for that reason.

The impact on auction activity by proxy bidding is managed by the present system in a number of ways. For example, a high proxy bid entered into the system 10 too early in the auction may have a negative impact on the auction and quell auction excitement. For this reason, in one alternative embodiment, a single proxy bid may be entered a number of times in different increments throughout the auctioning of an item up to the proxy bid. For example, a proxy bid of $100 for an item that is currently bid at $75 may be injected into the auction at intervals such as $85, $95, and $100, provided there is other bidding. The number and amount of these intervals may be programmed into the system or modified during the auction. The system 10 may be programmed to manage proxy bidding in a number of other ways as well, including determining whether proxy bids are entered before or after remote telephone, computer, or live bidders. Another embodiment may help manage proxy bidding by sounding different tones when a bid is from a proxy bidder, similar to the approach discussed above where different tones might be sounded to distinguish remote bidders. This approach could be extended to distinguish other classes, categories, or locations of bidders, including bid spotters and the auctioneer as well as other potential geographic distinctions and the like. In any event, the distinction in tones could be provided strictly to the auctioneer and/or those otherwise administering the auction, the bidders as a whole, or combinations or selections of any of these groups.

The disclosure above discusses the ability of the auctioneer or the auctioneer's clerk to dynamically adjust (preferably using touch screen administration on the auction control panel interface 600, one embodiment of which is illustrated in FIG. 8) the opening ask and the opening bid increment and to change the size of the bid increments on the fly and have changes immediately reflected on the auction control panel. The opening bid increment would be shown in box 640 and around the display of the asking price in boxes 700 and could be changed before commencement or on the fly after the auction, has started. In the normal course of an auction the classic auction style is to reduce increments, as fewer bidders remain in the hunt 1000, then 500, then 250, then 100. Also, while the common pattern is to reduce increments, in some hot auctions, particularly with unique, difficult to value goods where the movement is less predictable, it may also be desirable to increase the bid increment to accelerate the flow of the auction upwards, so the preferred embodiment of the system provides the ability to increase or decrease the increment. In the normal reduction pattern, a lot priced at 10,000 might call for 11,000, if no answer . . . then 10,500, if no answer then 10,250, and then 10,500 and then 10,750 etc. At some auction houses, they use a different procedure. They drop from 1000 to 500, then to 200 or 300 depending on the last bid. Bidding would go 10,000, 10,200, 10,500, 10,700, and 11,000. One embodiment of the present system has automated this function so that if the 2,5,7 option is selected, when clerk selects the next increment down from 500 hundred (250) the displayed ask is 200 or 500 or 700 or 1000 depending on last bid. This provides a very valuable supplement to auctioneer and is otherwise difficult to impossible to execute manually by clerk. Similarly, other auction houses follow the following bid increment system, increasing in steps from 10 to 25 to 35 to 50 to 60 to 75 to 85 to 100. These increments may also be programmed as an alternative setting made through the auction control panel, again simplifying the maintenance of the auction by the auctioneer and his clerk using the system, while retaining the traditional increments of the auction customer. A similar feature enables the auctioneer, or others, to decrement the bid where no bid is received at an opening price.

While the disclosure above focuses on the remote participants in a live auction, in its most filly realized state, the system will permit the integration of bidders at the auction site, at remote locations in other rooms in the building at the site, and in remote locations geographically disparate from the auction site. In more traditional auctions, the auctioneer leads the auction from the auction room. A collection of bid spotters will be strategically positioned in a large room to assist the auctioneer by spotting bids and calling out on behalf of the bids they spot. The auctioneer may also spot bids personally. In one embodiment of the present invention, bid spotters (including the auctioneer in some embodiments) use their own input devices, for example radiophones such as 900 Mhz phones, walkie-talkies or other RF devices, cellular phones, pads, or other devices operable for wireless or wired communication, to provide instant capture of the bids they spot by the present system. Communication with wireless devices may occur using well known techniques such as WiFi or Blue Tooth. In another embodiment, the system may, for example, employ voice-recognition systems to log these bids from bid spotters. In this sense, the system enables a level playing field even where remote bidders are not involved, by avoiding the challenges in very large facilities where the auctioneer may miss the first bid in favor of a second because of the direction he or she is looking. Similarly, either with or without the bid spotters having this ability (although preferably with), the auctioneer or the auctioneer's clerk may be provided with a direct link with the system to spot bids on their own and capture them into the described auction system.

A common programming feature preferred in the previously discussed embodiments prevents an individual bidder who logs in from their input device, preferably a telephone (cellular or otherwise), from bidding against themselves by preventing additional bidding from that ID when that ID is the high bidder. To accommodate the use of phones by bid spotters, they are given unique IDs which are permitted to trap multiple bids, where it is then the responsibility of the bid spotter to know which individual's bid he has caught at any one time. The system however, objectively arbitrates which bid spotter was first in with the new bid. In such a manner, the computer may be used as a system to improve auctions even at the auction site itself, in addition to the ability to then relatively seamlessly integrate a series of remote locations into the same process.

In some embodiments where bidders are prevented from bidding against themselves, an additional feature may be present which addresses a potential problem with reserve auctions. If the high bidder is beneath the reserve and no other bidder is continuing to bid up the price, then a situation may be reached where the item will not be sold even where the high bidder might have been willing to pay more for the item to meet the reserve. The additional feature, referred to as challenge bidding, may allow the auctioneer or the auctioneer's clerk to lift the prevention on bidders bidding against themselves in order to allow the bidder to bid up the price in an effort to meet the reserve. On the auction control panel interface 600 embodiment of FIG. 8, button 650 may be used to open such a round of challenge bidding. Once challenge bidding is initiated, preferably other bidders may also rejoin the process, if desired. Another option for this embodiment is to implement a secondary restriction which will only allow a bidder to bid against themselves until the reserve is met and then return to the original condition where a bidder may not bid against themselves. The change to challenge bidding for a given auction is typically done on the fly during the course of the auction of an item without interrupting the auction.

In another embodiment of software implemented bidding restrictions, bidders from the same dealership or from affiliated dealerships may be prevented from bidding against each other in the same manner that bidders are prevented from bidding against themselves. The dealer (or other business relationship) relationship is defined in the process of setting up participation and may be associated with the bidder ID in the system. In this manner, bidders who are not in good communication with associates from the same ultimate business entity may be prevented from accidentally driving up the price of an item when both are attempting to acquire it for the same end user. Similarly, restrictions may be put in place which prevent a consignor, or a bidder affiliated with a consignor, from bidding on the assignor's own consigned auction items. In this manner, an affiliate of a consignor may be prevented from accidentally buying an item from his own affiliated entity in situations where the consigning entity is not clearly identified. It also would act to prevent a consignor (or affiliate of a consignor) from bidding up their own lot in an effort to increase sale value or act as a hidden reserve.

In another embodiment of the auction as described above, it may be desirable to allow bidders in the auction room, or even in a remote room using bid spotters, to bid anonymously using their cell phones or bid to bid spotters or both (competitive nature of some bidding is such that bidders want to confuse their competitors). In such a case, as discussed with respect to audio through the phones above, the delay of the audio provided to phones of users who are known to the system to be present at the auction site may be chosen to be zero to prevent confusion between the live audio they are hearing and the audio presented through their phones.

Although addressed briefly above, the concept of latency management plays a key role in many of the embodiments of the present system including the most preferred embodiment. Latency management is attained primarily through use of the variable controlled delay time period (or delay window) between the broadcasting of the asking bid and the opening of a window of time during which the system will accept a bid acceptance signal based on that asking bid (bid acceptance window). The delay time period helps solve a problem unique to the technical solution enabling remote bidders to participate in the auction. Since under the present application, only one bid acceptance signal is accepted and identified as the current bid, there is often a race to be the first to accept at the new asking bid. Further, there are latency control problems possible in a computerized system such as the current one because of the rapid speed with which the computer can respond, make updates, and accept new changes, compared with the relatively slow reaction/comprehension speed in humans. Other complicating factors are the various small delays inherent in processing and broadcasting information and receiving information from remote bidders. In a rapidly moving auction, there is the potential for the bids to be escalating so quickly that bidders send a bid acceptance signal to what appears to be one asking bid, but, by the time that asking bid has been displayed to the remote bidder, another acceptance and new asking price have been generated by the auction system so that when acceptance is received, it is interpreted by the system as an acceptance of a later asking bid. This can generate significant bidder frustration and damage buyer confidence and comfort in the environment, the method, and the system. Credibility and trust are key factors in the relationship between auctioneer and buyer and anything which adversely affects auction credibility adversely affects the results of the auction.

A variable controlled delay period (to help manage latency) can help prevent this kind of overrunning of the system, making sure bidders in all locations know what asking bid they are trying to accept. However, at various points in a given auction, the auction may take on a different pace or different technological conditions that may make different delay periods desirable (for example, unexpected popularity of an item) to handle these without shutting down the auction and restarting. It is highly advantageous to be able to adjust the delay window during the course of an individual auction of an individual item. The delay window is optimally set in a live setting when there are no complaints that the intended bid is different than the caught bid and on the other hand there are no complaints that the system would not accept my bid even though there was no one else bidding. This optimal setting may change over the course of an auction. The ability to adjust on the fly allows true management of this latency for the environment and events actually occurring.

In the most preferred embodiment, there is an integrated bidding system with an absolutely level playing field as to latency and fairness for all participants regardless of their location, technical competence, or sophistication of their equipment or network. In developing and improving the system, analysis of latency has provided the following formula which has proved helpful in anticipating the desired delay time:

LS=Latency Setting

B=Inherent latency of Bid transmittal system (in telephony we are guaranteed no more than 60 milliseconds)

C=Human ability to comprehend and respond to visual/audio information (estimated for the purposes of this formula to vary between 0.05 and 0.30 seconds).

D=Inherent delay in video transmission (varies according to broadcast methods . . . from virtually zero for locally broadcast analog video . . . to approx ¼ second for a non encrypted analog video signal broadcast over satellite . . . to 2 or more seconds for encrypted digital broadcast . . . and who knows for streaming video over the internet?) Accordingly, the ideal full comprehension latency setting (which could be used as the initial latency setting) for a given auction environment is LS=B+C+D.

This would ideally provide a complete comprehension of the new information being broadcast before allowing any bids to be entered.

An alternative approach to considering the latency settings follows. The principle of latency setting involves certain assumptions and rules. A perfect setting is one where the programmed delay window is just longer than the longest latency for the most latent participant. Accordingly, correctly setting the delay requires knowledge of the actual current audience, the method by which each member of that audience receives his information, and the inherent delay experienced by the most latent participant in that audience. Various delivery methods differ in their broadcast latency. Various bid response methods vary in their transmittal latency. Various individuals comprehend and respond to information at different rates (also latency). As a result, the administrator should take all these elements into account in determining the optimal problem free setting. As stated previously, the optimal setting is where the delay window is just longer than the longest latency for the most latent participant. It is conceivable that each individual password (or the information stored in the database associated with that User ID) will also contain data on the latency inherent in that participant and that as each new bidder signs on the setting automatically adjusts to the highest common denominator thus ensuring a perfect setting. In such a case where early participants are all located in the auction room, then only human comprehension needs to be accounted for. As more participants sign on who are just analog non-encrypted participants, then the setting adjusts upward slightly to account for them. As more sign on who happen to be analog encrypted, another upward adjustment. Then digital encrypted participants would produce another upward adjustment. Then overseas encrypted participants taking their signal from the digital encrypted US signal would again produce an upward adjustment. As bidders disconnect, the system looks for the most latent participant and resets according to the new highest common denominator. As discussed below, this full latency delay would be the setting that is activated as the auction nears conclusion, but may not be the setting employed in the early going which could easily be setting divided by 2 or 3, but never less than enough time for reasonable comprehension. This approach would make the setting dynamic and more probable to be optimal than the manual adjustment by the clerk, yet the clerk has the means to override the dynamic setting by adjusting the "never less than" amount on his control panel.

Typical latencies could fall in the following ranges for the purpose of estimating and anticipating appropriate latency settings under this disclosure:

Human Comprehension (Never Less than)

about 0.1 to 0.3 seconds

For a Local Analog Broadcast virtually nothing other than human comprehension unless there is a manipulated delay such as used by censors For Cable Local Broadcast or Direct Fiber Feed to Designated Clusters (Whether on the Continent or Even Overseas)
  virtually nothing other than human comprehension unless there is a manipulated delay such as used by censors
For Analog Non Encrypted Satellite Broadcast
  about 0.25 seconds plus human comprehension
For Analog Encrypted Satellite Broadcast
  about 0.25 seconds plus human comprehension plus time to encrypt (estimated at about 0.25 seconds)
For Digital Broadcast where Fiber Feed is Direct to Digital Uplink Center
  about 1.5 seconds to 2 seconds (digital delay such as for an ECHOSTAR satellite) plus delay for fiber feed (almost zero) plus human comprehension.
For Digital Broadcast where Feed to Digital Uplink Center is from an Analog Satellite (Otherwise Called a Double Hop)
  about 0.25 seconds for analog hop plus about 1.5 seconds to 2 seconds (digital delay) plus human comprehension
For Overseas Participants Who Receive their Signal from the Digital Broadcast Satellite
  the normal digital delay plus the delay imposed by connecting added satellites (estimated from between about 0.25 seconds to 1 seconds per each satellite link depending on the nature of the satellite) plus the delay created by conversion to another video format such as PAL for Europe (estimated at about 0.25 seconds)
For Overseas Participants Who Receive their Video Information Via a Local Satellite Whose Information is Captured Directly from an Uplink Center which is Directly Connected by Fiber to the Point of Origin of the Broadcast
  fiber delay (almost non existent) plus digitization and encryption delay if any (about 1.25 to 1.5 seconds) plus one hop (about 0.25 seconds) plus conversion to PAL format (estimated at about 0.25 seconds) plus human comprehension (about 0.25 seconds).

In some rapidly moving auctions the full latency would slow the auction down unacceptably, particularly in the early going when momentum should be building. The implementation of a full delay could damage the pace of an auction. To improve the pace, a decision may be made to implement an initial time delay which is short enough that not everyone may always have complete comprehension, but at the lower levels of an auction accidental overbidding is less disturbing to the bidders. Then, as the close or sale approaches and someone may be permanently caught on a missed bid, the delay is moved up to the full amount believed necessary for full comprehension. The system may use several factors as an indicator of the time to initiate full latency. For example full latency may be implemented at a specific prompt by the auctioneer that the auction is winding up, it may be triggered when the increment by which the bids are increasing becomes smaller to a selected level (indicating that there is less activity as the close of the auction is near), or it could be triggered when the time between bids stretches out to a certain distance (again indicating less activity and also indicating that there is less concern with the latency slowing down the pace of the auction). While in the most preferred embodiment discussed above, the latency is manageable by the auctioneer on the fly to tune precisely to the course of the auction; it may also be desirable to build in some automatic latency settings and improvements to reduce the need for on the fly changes.

At present, for embodiments focusing on improving automating latency and adjustments, for initial settings, the preferred initial latency setting (the time delay setting) is between 0.2 and 3.5 seconds, more preferably between 0.3 and 1.5 seconds, and most preferably between 0.5 and 1.0 seconds. For broadcasts involving digital communications by satellite, the preferred final latency settings are between 1.5 and 3.5 seconds, more preferably between 1.75 and 2.25 seconds. While in some circumstances, it is possible to remain at the initial latency setting throughout the auction, it is preferred to move from the initial latency setting to the final latency setting near the close of the auction. The most preferred method of making this shift is by timing the delay between bids received. In the most preferred method, when the delay between bids received reaches a certain multiple of the initial latency setting, the system automatically migrates to the final latency setting. The preferred multiple is between about 1 and 3 times the initial latency setting, more preferred is between about 1 and 2 times the initial latency setting, and most preferred is about 1.5 times the initial latency setting.

While in the latency control embodiments discussed above the latency setting is universal for all participants, either local or remote; in an alternative embodiment there may be independent latency control for auction room participants. While applicable generally, this is particularly useful in the embodiments where bid spotters in the sale room are using phones to capture bids and it would be highly undesirable for the bid spotter in the live environment (where accidental overrunning is much less likely without the broadcast delays) to be unable to capture a bid due to the delay time period. Independent adjustment of their latency ensures smooth operation in the auction room. While this may provide a small advantage to participants in the auction room, this is traditionally considered an acceptable benefit for taking the trouble to attend the auction site in person. Similarly, this reduced or eliminated latency could also be provided to bidders who are remote from the main auction room itself but are still located in alternate rooms in the same facility or complex. Their broadcast would not be traveling to satellite so they also are not subject to one of the largest delays which can lead to confusion. Again, it may provide a slight advantage to people who have traveled to the auction venue either in the auction room itself or in alternate rooms which, while remote under the definitions of this disclosure, are still within the grounds of the primary auction site. While in some instances it would be preferable to eliminate latency for these bidders, if the decision is made to independently manage the latency of these bidders a preferred latency would be between 0.1 and 0.5, more preferably between 0.1 and 0.3 seconds to still help reduce overrunning due to human comprehension time and the "inhuman" nature of the system recording and incrementing the new bids.

This disclosure addresses the possible use of phones by bid spotters and/or the auctioneer or even the use of direct connections (which, for example, may be hard-wired or radio remote to a hard-wired connection) by either type of entity (available for example by integrating a mini network) so that those within the auction room are relieved of need to use a telephone as an input device but can do so if they so choose. In either event the auctioneer or bid spotters may capture bids of those in the room into the auction system by use of such direct connections. The use of hard-wired connections or other direct connections not traveling through the phone network could also be singled out for independent latency control or elimination of latency altogether. This could give priority to any bid trapped by auctioneers and bid spotters in the point of origin thus ensuring that buyers present on site have a slight advantage over absent buyers. This will be invisible to virtually anyone but avoids issues of obvious confusion in the live auction room. In summary, independent latency adjustments may be made to the auctioneer and/or the auctioneer's clerk, the bid spotters in the main auction room, the bid spotters in other rooms geographically close but remote from the main auction room, independent bidders present in the main room, or independent bidders in other rooms geographically close but remote from the main auction room. Similarly independent latency adjustments may be made to some combination of these entities or defined groups of these entities as a group.

One other aspect of latency to be considered relates to the ability of bidders on site to have their bids fairly captured by bid spotters using input devices. In this instance, while these bidders would not experience any of the broadcast delays, they face not only delay based on their own reaction time, but also a delay based on the reaction time of the bid spotters to the call or signal of the bidders. This extra delay could place these local bidders at a disadvantage against remote bidders. Since it is typically not acceptable to disadvantage the bidders who have personally attended the auction site, this may also call for some additional latency on the remote bidders to account for the reaction time of the bid spotters, possibly between 0.1 and 0.3 seconds or as otherwise discussed elsewhere in this section. This should actually help level the playing field or err to the side of creating advantage for local bidders rather than the other way around. Further, in some auctions, to maintain the traditional feel, the bid spotters may perform in the traditional manner, with their "analog" yips rather than using the input devices themselves. To accommodate this, a clerk or additional administrator with a keyboard would catch the bid spotters' yips and press the appropriate key to capture them into the system. This adds yet another comprehension delay, the bidder recognizing the new asking bid, the bid spotter recognizing the bidder's signal, and the clerk recognizing and then capturing the bid spotter's yip. In these events, another 0.1 to 0.3 seconds should be added to the latency of the remote participants (giving remote participants the longer delay), resulting in anywhere from 0.2 to 0.6 seconds delay, more preferably 0.3 to 0.5 seconds delay. Again, these delays may alternatively be accounted for based on similar accounting for human comprehension elsewhere in the specification.

In another embodiment, facilities may be provided to allow proxy bidding using the computer system to provide the bids up to a threshold set by the absentee bidder. These bids may be taken into account along with the remote bids, local bids, and bids captured by bid spotters or the auctioneer. In such an embodiment, there is a preference to add a built in additional delay (or latency) before the computer is allowed to enter and accept the proxy bids, to prevent any advantage accruing to the absentee bidders as compared with either attending or active remote bidders. This delay would provide time for remote bidders to receive the updated information, comprehend it, and have time to respond with their own bid before the proxy bid would automatically take effect. In the absence of such a delay, the proxy bidders would almost always win the current bid until their threshold was reached and the auction would progress at an extremely high speed (faster than the control of the auctioneer) if there were more than one proxy bidder involved until one of the proxy bidders threshold had been reached. It is believed this would reduce many of the positive factors in having a live auction with a live auctioneer. A preferred delay for proxy bidders would be at least 2 seconds longer than the actual latency for the most latent bidder (a remote bidder with a satellite link in their broadcast), more preferably 2 to 5 seconds, and most preferably about 3 seconds. This preferred delay could also be implemented against whatever the longest system programmed delay is rather than the actual latency of the various bidders, since, as noted above, the programmed delay may be run at something less than the actual latency at some or all points during an auction.

In absolute terms, experience has demonstrated a preference for between 4 and 5 seconds of absolute programmed delay for proxy bidders. In summary, for the most preferred latency control settings, the shortest latency control would be provided to bid spotters and possibly local bidders, the next shortest control to remote bidders, and the longest latency control to proxy bidders.

In an embodiment which employs proxy bidding, the system may also be programmed to accommodate overriding of the proxy by the bidder who has set the proxy bid. This could enable that bidder to sign in using their bidder number (a number which would also be associated with the proxy bid) and bid remotely or in person at the auction even above limits originally set for the proxy bid. Alternatively, similar to the ability to lift the reserve on the fly, a proxy bidder could be provided the ability to use key commands during an auction of a lot to cancel a proxy bid or lower the bidding limit to the price of the current bid. Also, with respect to proxy bidders, it may also be desirable to add latency control to the confirmation process, providing a programmed delay before the winning bid is confirmed, to avoid any appearance of impropriety which might be created by instantaneous confirmation when the auction is completed. A preferred delay before confirmation might be between 3 and 5 seconds, more preferably about 4 seconds.

The use of routers and ISDN lines or other direct point to point connections such as T-1 lines or private networks makes possible the staging of remote auctions where the auctioneer, the bid spotters, and the core audience are in a location different from the studio where the broadcast is produced or alternately where the broadcast originates from a number of locations but the bidding system is stationary and relates to any and all of the locations. In either event, the remote locations receive the same display and still may interact through their input devices. Whereas the typical layout calls for all elements of the broadcast to be in the same room or building, they can be separated by an infinite distance and with proper connectivity used to put the same presentation on to all bidders.

Figure 9:
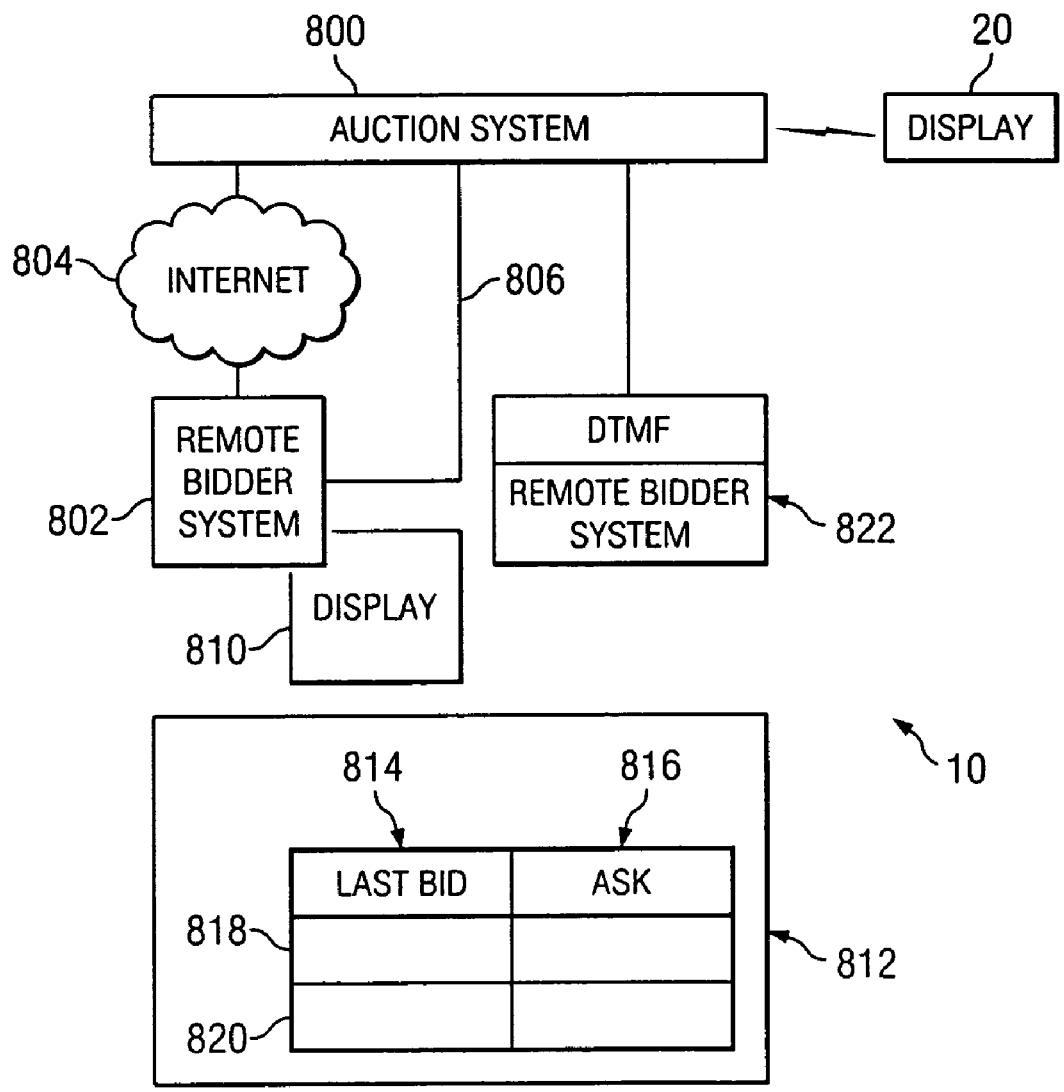
FIG. 9 is a diagrammatic illustration of another embodiment of the present system for receiving bids from one or more remote bidders.

FIG. 9 illustrates another embodiment of the system 10 including an auction system 800 communicating with a remote bidder system 802 for receiving bids. The auction system 800 may include one or more computer systems, such as network servers, and the receiver/transmitter processor 26 for auction operation. The auction system 800 communicates via the internet 804 (or other network 806, whether private, dedicated, or other networks) with the remote bidder system 802. The auction system 800 may also include, in some embodiments, the broadcaster system 34, the display 32, the terminal 30, and other systems or combination of systems such as those discussed above. The communication between the auction system 800 and the remote bidder system 802 may be accomplished via the internet 804 using well known communication technology and may or may not be encrypted or otherwise securely transmitted. Where encryption is used, secure socket layer (SSL) or other encryption technologies may be employed, and a virtual private network (VPN) and/or additional security measures may be employed.

The remote bidder system 802 may be a standard computer system having a display 810 and that is operable to access the internet 804, such as by using an internet browser. As such, the bidder or user of the remote bidder system 802 may view the auction over the internet 804 where the auction system 800 broadcasts the auction, such as by a webcast or otherwise to an internet 804 locale accessible by the remote bidder system 802. The remote bidder system 802 may log into a website, view pictures, streaming audio and/or video, and other information about the auction, and participate in a particular auction. The remote bidder system 802 is not limited to a computer and may be any device operable to access the auction system 800, via the internet 804 or otherwise, such as, but not limited to, a personal digital assistant (PDA), a wireless or other telephone or device, or other devices or systems now employed or developed hereafter with such capability.

The remote bidder system 802 in the present embodiment may be provided with a client application operable on the remote bidder system 802 to receive information from the auction system 800 about one or more ongoing auctions. For example, where the remote bidder system 802 has a high bandwidth connection to the internet 804, streaming audio and video may be received by the remote bidder client, including live auction broadcasts and information, video or still pictures of the subject of the auction, and current bid, ask, and other relevant auction information. Where the remote bidder system 802 has more limited communication capability or bandwidth, the remote bidder system 802 may only be provided with one or more still pictures of the subject of the auction, and perhaps only the current asking bid for the item being auctioned. A number of combinations of the information may be provided depending upon the bandwidth and communication capabilities, hardware, and other limitations of the remote bidder system 802. In a preferred embodiment, the remote bidder system 802 may receive a plurality of images, such as graphic files, of the subject matter of the auction which may be periodically cycled or scrolled for viewing on the display 810. The client application may also include a crawl on a portion of the display 810 providing the user with useful information about the subject matter of the auction, including quality, history, seller, and other information potentially useful to a bidder.

The client application may include a client bid box 812 operable on the display 810 to provide the user or bidder with the bid pricing information, such as last bid 814 and current ask 816, for the subject of the auction. A first row 818 may provide the last bid 814 and ask 816 in a first currency, while a second row 820 in the client bid box 812 may provide the last bid 814 and ask 816 in a second currency. A number of additional rows may be provided, each displaying the bid pricing information in different currencies, which may be useful and relevant to user or bidder based upon their geographic locale or nationality. The client bid box 812 is illustrated as having limited information which may be beneficial to promote efficient communication over a computer network, such as the internet 804. However, other information may be displayed on the display 18, whether or not within the borders of the client bid box 812, to provide the bidder with sufficient information to make bidding decisions and participate in the auction.

As described in detail above, latency and delay techniques may be used to ensure that the price, such as the current ask price, at which a bidder places a bid is the same price that the auction system 800 enters or accepts the bid for that particular bidder. Latency over the internet may be more complex to account for, however, than over more predictable networks, such as standard telephone networks as described above. Instead, in the present embodiment, the client application on the remote bidder system 802 tags the bid sent from the remote bidder system 802 to the auction system 800. The auction system 800 uses the bid tag to verify, before accepting the bid, that the price (such as the current ask price) which was present in the remote bidder system 802 at the time of the bid at the remote bidder system 802 has not changed or is the same as the price (such as the current ask price) at the auction system 800 at the time the bid is received by the auction system 800. This bid tagging techniques may eliminate the need for programmed delay latency considerations for remote bidding over networks such as the Internet 804.]

It will be appreciated that when the auction system 800 transmits updated pricing information, such as the last bid 814 and ask 816, for an auction item, there is some delay before it is received by the remote bidder system 802. Additionally, additional time is consumed by the remote bidder system 802 processing and updating the bid box 812 with the new pricing information. Also, additional time is required for the user or bidder to recognize and process this new pricing information and for a bid from the remote bidder system 802 to be transmitted back to the auction system 800. This delay creates a likelihood that elsewhere in the auction a new bid may be received by the auction system 800 by other bidders. At that point in time, the pricing information in the client bid box 812 at the remote bidder system 802 contains inaccurate and out-of-date information, although the auction system 800 would then begin transmitting the updated pricing information to the remote system 802 again. However, due to time delays between the auction system 800 and remote bidder system 802, a likelihood exists that a bidder at the remote system 802 will submit a bid based upon inaccurate and out-of-date information in the ask 816 of the bid box 812, which may prove problematic. For example, the auction system 800 may have $125 as the current ask and $100 for the last bid for an auctioned item, while the last bid 814 and ask 816 contain $75 and $100, respectively, on the client bid box when it has not yet been updated from the prior amounts. If the bidder at the remote bidder system 802 submits a bid at this point, a likelihood exists that the bid submitted by the remote bidder at the ask 816 of $100 could in fact be received and accredited to the remote bidder for $125.

The present system 10 provides a unique technique for addressing these and other associated problems by tagging the bid sent by the remote bidder system 802 to the auction system 800. In one embodiment, the auction system 800 may create a unique identifier each time the price for the auctioned item is updated, such as when a new bid is received at the auction system 800 or when the price is changed by individuals managing the auction. The unique identifier may, for example, be a time stamp generated by the auction system 800 when the new bid is received. The unique identifier might also be a uniquely generated number, combinations of the current pricing and time, or any of a number of unique identifier, stamps, tags, systems, or techniques capable of uniquely identifying a transaction. The auction system 800 would then transmit the updated bid or price information, such as the last bid 814 and ask 816 to the remote bidder system 802, including the unique identifier or tag along with the transmitted data.

When a bidder at the remote bidder system 802 subsequently submits a bid, the bid, which may be thought of as a message or signal, transmitted to the auction system 800 may include this tag. Thus, when the bid is received by the auction system 800, the tag can be compared with the tag at the auction system 800 associated with the then current price information for the auctioned item. Where the remote bidder system 802 tag and the auction system 800 tag is the same, the auction system 800 enters the bid and associates it with the bidder at the remote bidder system 802. Where the remote bidder system 802 tag and the auction system 800 tag are different, the auction system 800 rejects the bid and notifies the remote bidder system 802 accordingly. In one embodiment, this notification could be identical to the "bid not taken" notification provided to a telephone bidder who bids while the bidding window is closed during one of the programmed delays used to account for latency in that environment. In effect, the tag, which could merely include the current pricing information, provides a means for ensuring that the price, whether bid, ask or otherwise, for the auctioned item is the same at the remote bidder system 802 at the time when the bid is placed by the bidder as it is at the time when the bid is accepted by the auction system 800.

Although the unique identifier or tagging technique discussed above provide a useful way of overcoming this problem and providing additional accuracy and confidence in the auction, a number of other techniques may be employed. For example, the tags may be generated by the remote bidder system 802 (such as a tag providing the current ask at the remote bidder system 802) and validated by the auction system 800, tags in combination with latency based on delays over the Internet 804 may be employed, or any number of combination of systems or other systems and techniques may be employed. Other techniques will suggest themselves to one skilled in the art based on the present disclosure to ensure that when the bid is placed at the remote bidder system 802, the bid is only accepted by the auction system 800 when the price for the item at the remote bidder system 802 at the time the bid was placed is the same as the price for the item at the auction system 800 when the bid is received or otherwise processed.

Although only a single remote bidder system 802 is illustrated, it is anticipated that the present system may include a plurality of remote bidder systems 802 situated at various locations and communicating with the auction system 800 via the internet 804 or other networks 806. In one embodiment, it is anticipated that the remote bidder system 802 may be employed at the actual location of the auction or auction system 800. For example, a bidder or bid spotter present at or near the auction may use a device, such as a personal digital assistant, wireless phone, or other device operable to communicate over the Internet 804, to place bids. In other embodiments, the individual bidders and bid spotters at the auction may be provided with devices which communicate wirelessly or otherwise using well-known wireless technologies, such as WiFi and Blue Tooth, to communicate either directly or indirectly with the auction system 800 for placing bids. Although the Internet 804 is illustrated as a communication network used to communicate between the remote bidder 802 and auction system 800, it will be appreciated that a number of alternative communication networks and techniques may be used, whether currently available or subsequently become available, to provide communication between the remote bidder system 802 and auction system 800. The present disclosure should in no way be limited to communication over the internet 804, or the actual physical location of the remote bidder system 802 or distance between of the remote bidder system 802 in proximity to the actual auction or auction system 800.

Furthermore, a number of ways may be used for communication between the auction system 800 and the remote bidder system 802, which will readily suggest themselves to one skilled in the art for communicating auction related information there-between. For example, the users of the remote bidder system 802 may be provided with data, audio and video auction-related information in a number of ways. Audio, pictures and/or streaming video, and data about each of the auctions may be transmitted over some interval, before or during the auction, from the auction system 800 and stored on the remote bidder system 802. Where the remote system 802 has a lower bandwidth connection, this communication method may promote quicker display of information than real-time streaming all information at the time of the auction. Alternatively, information may be broadcast from the auction system 800 uniformly out to all the remote bidder systems 802 regardless of the particular configuration of a specific remote bidder system 802. Other techniques and methods, such as eliminating only the live-auction video portion, for communicating information to the remote bidder system 802 may be employed and are within the spirit and scope of the present disclosure.

In some embodiments, the client application on the remote bidder system 802 may be operably configured by the user to determine the type of auction information that will be transmitted and how such transmission will occur based upon, for example, the bandwidth of a particular remote bidder system 802. As bid information is updated during the course of the auction, such information may be transmitted from the auction system 800 out to the one or more bidder systems 802 on a periodic basis or predetermined basis, or only when the bid information has been updated or changed. Communication of this data may be accomplished, for example, by the client application on the remote bidder system 802 periodically polling the auction system 800 for the current bid pricing information. This latter technique may be useful where the remote bidder system 802 is behind a firewall or other security system which might otherwise reject an arbitrary signal sent from the auction system 800. By polling or requesting the information from the auction system 800, the return signal from the auction system 800 would be permitted to pass such a security system to reach the remote bidder system 802. Another technique may be to program the client application to request that the auction system 800 to transmit current pricing information only when the price is updated, such as after a new bid is received and the last bid 814 and ask 816 are updated. As discussed above, in this and a number of related embodiments, where the same information is being provided from the auction system 800 to a collection of remote bidder systems 802, whether it is being pushed to the remote systems or pulled from the remote systems, and whether it is traveling to all at precisely the same time or is merely being provided or available in a generally contemporaneous manner, this information is considered to be broadcast from the auction system 800 to the collection of remote bidder systems 802.

The client application on the remote bidder system 802 may be a thin client or low profile computer application operable on the remote bidder system 802, which may be useful particularly where the remote bidder system 802 is a less robust device, such as a wireless telephone. In some embodiments, the client application may be a more robust full-featured client software application deployed on the remote bidder system 802 where the remote bidder system 802 is a computer or other device with more extensive hardware capability and capacity. Where the client application is more robust, considerably more functionality may be enabled on the client application to allow the user more flexibility and more features during the auction process. These features include, but are not limited to, accessing the user or bidder's information at the auction system 800 for establishing credit lines, making payments, providing information for sale at the auction, and updating information related to items placed for sale at the auction by the user of the remote bidder system 802. The client application on the remote bidder system 802 may be provided with a means for allowing a bidder to simply and easily bid at the remote bidder system 802. For example, the client application may include a button or other user interfaces to allow the user to place bids, for example by clicking a mouse on a bid button.

In other embodiments, the remote bidder system 802 may be a standard telephone employing DTMF over a standard telephone network, similar to that described above, and employing the tagging techniques in lieu of latency and delay considerations during the auction process. As such, a telephone bidder may bid on an item, such as by telephone key-pad or voice response, and the bid may include a tag related to the current price of the auctioned item from the bidder's perspective. A number of techniques may be used for tagging the bid. For example, the bidder may, when making a bid, key-in a tag or identifier, such as entering the current bid price, time, or other sequences, or certain data may be obtained from the telephone communication by the auction system 800. The purpose of the tag is to ensure that the price for the auctioned item at the time the bid is placed is the same as the price for the auctioned item at the auction system 800 when the bid is received or processed.

In another embodiment the system 10, as illustrated in FIG. 9, includes the remote bidder system 802 and auction system 800 used in combination with a second remote bidder systems 822 utilizing standard telephone systems communicating bids, such as via DTMF signals, to the auction system 800 either directly or through subsystems, as described above. The remote bidder system 822 may include aspects described above with reference to the remote location 12 and input device 18. The auction system 800 may be concurrently broadcasting, such as via the broadcaster system 304, live audio and/or video information to displays 20, described above, for viewing the auction by the user of the second remote bidder system 822. Thus, the remote bidder system 802 employing the tagging techniques previously described above may be used in conjunction with the second remote bidder system 822, which communicates bids to the auction system 800 using the above-described latency and delayed techniques or the tagging techniques. As such, the auction system 800 is operable to employ both time delay and latency, as well as filtering bid tags depending on whether the bids originate from the second remote bidder system 822 or the remote bidder systems 802. This allows the auction system 800 to negotiate the various bids to promote an accurate and fair auction that provides bidders with confidence that the price at which the bidders intend to bid is the price that will be accepted by the auction system 800.

The auction system 800 may be provided with vast administrative capabilities. For example, the auction system 800 has considerable business and accounting capabilities and is operable to maintain extensive information about all auction participants, buyers, and sellers. As such, the auction system 800 is operable to generate payments to sellers, via mailed check or electronic funds transfer, for items sold at auction. The auction system 800 is further operable to automatically generate invoices, after each item is auctioned or at the end of the entire auction, to buyers for their purchases, taking into account the sale of any of buyers' items at the auction.

The auction system 800 is further operable to manage every aspect of the auction process related to the systems, such as live video, telephony, and Internet broadcasts, employed for the auction. Settings may be easily modified so that pressing a certain number on the telephone, for a standard telephone bidder, directly calls the credit department or help desk. For a bidder that wants to be called shortly before a particular item is auctioned, the auction system 800 maintains modifiable settings for the number of call attempts to contact the bidder and how far in advance of the item being auctioned to place the calls. The auction system 800 may maintain settings related to remote bidder systems 802, such as how many login attempts to allow before disconnecting, and selecting what information will be transmitted to the bidder.

It therefore can be seen that one embodiment of the present remote auction bidding system allows participants at remote locations from the auction site, or physically present at the auction site and using devices to submit bids, to participate in an interactive manner in an auction. Participants may view, for example, still pictures, some or all of a real-time video broadcast, via video conference, broadcast television, satellite, cable or Internet transmission and may in some embodiments listen to an audio broadcast (in addition to or separate from the viewed broadcast materials) through any of the described techniques or over traditional telephony networks (land based, mobile, or satellite), and may communicate bids utilizing an input device such as, for example, a traditional telephone or Internet accessible computers and devices. The auction is capable of incorporating and receiving bids from remote participants having multi-cultures, language, and currencies. Although more sophisticated communication devices including, for example, two-way pagers, voice recognition systems, and the Internet may be utilized with the present invention, telephone devices provide for a simple, low cost, communication vehicle for participating in an auction conducted utilizing the present system. However, devices having access to the Internet or other networks may use the system as well. In one embodiment, the communications network merely requires a telephone infrastructure which can be based upon, for example, typical long distance telephone lines, cellular (mobile) systems, and satellite communication systems. The present system is scalable to accommodate unlimited numbers of participants based upon the size of the communications processor utilized at the auction site. Additionally, communications via network 16 may be secured utilizing encryption of data between the auction site and remote locations.

Use of the system described in the present disclosure enables synchronizing of multiple clusters of live bidders geographically spread out all over the world. In some of the fullest embodiments, the system makes live auctions better by integrating absent buyers with live events in one seamless and uniform environment whereby bidders either bid themselves, bid to bid spotter or bid to auctioneer.

In accordance with another embodiment, the present system provides for employing latency in combination with tagging. The tagging component may be used substantially as described above, yet bidders may still have their intended bid incorrectly logged by the auction system. For example, the auction system transmits an updated price for the subject of the auction to the remote bidders system, but before it is received, the user of the remote bidder system decides to bid at the previous price. As the user is in motion to bid, such as by pressing a key on the remote bidder system, the new price is received by the remote bidder system. The user presses the key moments after the remote bidder system has been updated with the new price, but before the user comprehends the changed price. The user, intending to bid at the earlier, lower price, actually bids at the later, higher price. The addition of latency control into the remote bidder system is one method for reducing or eliminating this potential for error. The term latency control or delay component as used herein includes any programmed or otherwise intended delay devised to account for latency that is inherent in the present system.

The latency control prevents the system from accepting bids received by the auction system before users, such as users of the remote bidding system, have had sufficient time to comprehend and respond to the new, updated price. Thus, in one embodiment, the latency control time is programmed to be approximately equal to this human comprehension factor. In some aspects, the latency control time may be 0.2 to 0.25 seconds which may allow the user time to comprehend the most recent price update and respond or bid.

In one embodiment, a first latency control component is present on the remote bidder system and a second latency control component is present on the auction system. The first latency control component on the remote bidder system is operable to determine when an updated price is actually received from the auction system and updated on remote bidder system. In this manner, the first latency control component may be set to provide sufficient time for the user of the remote bidder system to comprehend a price update on the remote bidder system before accepting bids at the updated price. The latency control component may be operable to take a number of actions in response to receiving bids before the user has had time to comprehend an updated price, such as, for example, rejecting the bid, or notifying the user that the price has changed and requesting that the user confirm the bid at the updated price prior to sending the bid.

The second latency control component on the auction system may be operable to manage the different latency control settings on the different bidding platforms. For example, the second latency control component may be set to the greatest latency control of other portions of the system, such as the latency control attempting to address the digital satellite broadcast portion of the system. In this manner, the users of the remote bidder systems, such as network or Internet users, are not given a potential advantage over other bidders. The second latency control component may be adjusted based on any number of factors or considerations to create fairness amongst all the bidders, to advantage or disadvantage some bidders, or to optimize the auction system to more accurately simulate a live auction environment while employing the various platforms.

In one embodiment, the present system provides for distributed interactive voice response on the remote bidder system. This aspect provides for distributing audio files, such as, but not limited to, Microsoft Windows .wav or other audio files, to the remote bidder system. These audio files may be loaded as part of the installation of a client application for enabling the remote bidder system. Alternatively, the audio files may be loaded to the remote bidder system in the background while connected to the auction system before or during an auction, or at other times. When a bid from a user of the remote bidder system is accepted as the new high bid, the auction system may transmit a signal to the remote bidder system to play the appropriate audio file. For example, the signal may initiate playing selected audio files on the remote bidder system producing "you are the new high bidder", "you're in", or "you are the winning bidder, please confirm". Thereafter if a third party bidder, either via the network or IVR system, becomes the new high bidder, the auction system is operable to transmit a signal to the previous high bidder's remote bidder system to play another audio file, such as "you're out". The present disclosure provides for replication of the IVR audio functionality on the computer network and remote bidder systems similar to the telephony IVR environment, described elsewhere in this and related disclosures, to simulate the real auction environment even when participating remotely over computer networks, such as the Internet. In embodiments where sufficient bandwidth is available between the auction system and the remote bidder system, the audio files may not need to be downloaded in advance. In these embodiments, the signal sent by the auction system to the remote bidder system may include the audio file to be played by the remote bidder system.

Whereas the present invention has been described with respect to specific embodiments thereof, it will be understood that various changes and modifications will be suggested to one skilled in the art and it is intended to encompass such changes and modifications as fall within the scope of the appended claims.

What is claimed:

1. A system for conducting interactive auctions with remote bidders, the system comprising:
    an auction system operable to maintain information related to a subject of an auction, the auction system establishing a price at which the subject of the auction is offered; and
    a remote bidder system operable to communicate a bid including bid information to the auction system, the bid accepting the offer for the subject of the auction at the price established by the auction system, the auction system using at least a portion of the bid information and a delay component to determine whether to accept the bid,
    wherein the auction system uses at least a portion of the bid information to determine whether to accept the bid based on whether the price for the subject of the auction has changed, the auction system further determining whether to accept the bid using the delay component which includes a delay time after the price for the subject of the auction is changed before the auction system will accept bids.

2. The system of claim 1, wherein the delay time is equal to a comprehension factor of a user using the remote bidder system.

3. The system of claim 1, wherein the delay time is between about 0.1 to 0.5 seconds to allow a user of the remote bidder system to comprehend a new price transmitted from the auction system to the remote bidder system before the auction system accepts a new bid from the remote bidder system.

4. The system of claim 1, wherein the delay time is between about 0.2 to 0.25 seconds to allow a user of the remote bidder system to comprehend a new price transmitted from the auction system to the remote bidder system before the auction system accepts a new bid from the remote bidder system.

5. The system of claim 1, wherein the bid information used by the auction system to determine whether to accept the bid includes a price component related to the price of the subject of the auction when the bid is transmitted from the remote bidder system to the auction system.

6. The system of claim 5, wherein the price component is the price of the subject of the auction at the remote bidder system when the bid is transmitted to the auction system.

7. The system of claim 1, wherein the bid information used by the auction system to determine whether to accept the bid includes a time component associated with when the auction system updated the price of the subject of the auction.

8. The system of claim 7, wherein the time component is further defined as a time-stamp of when the auction system updated the price of the subject of the auction.

9. The system of claim 1, wherein the bid information includes a first data indicative of an offer from the remote bidder system for the subject of the auction and a second data related to a time associated with the price of the subject of the auction, and wherein the auction system uses the second data to determine whether the price for the subject of the auction has changed.

10. The system of claim 9, wherein the remote bidder system and auction system communicate over a network.

11. The system of claim 10, wherein the network is further defined as the Internet.

12. The system of claim 10, wherein the network is further defined as a private network.

13. A system for conducting interactive auctions with remote bidders, the system comprising:

an auction system operable to maintain information related to a subject of an auction, the auction system establishing a price at which the subject of the auction is offered;

a remote bidder system operable to communicate a bid including bid information to the auction system, the bid accepting the offer for the subject of the auction at the price established by the auction system, the auction system using at least a portion of the bid information and a delay component to determine whether to accept the bid, wherein the delay component is further defined as provided on the remote bidder system and operable to provide a user a comprehension time of an updated price for the subject of the auction before allowing the user to bid at the updated price; and a second delay component having a delay time after the price for the subject of the auction is changed before the auction system will accept bids.

14. The system of claim 13, further comprising a phone system coupled to the auction system and operable to communicate bids to the auction system via a telephone, the auction system operable to accept bids from the phone system via the telephone.

15. A method for remote auction bidding, comprising:

updating an auction system with an auction system current price established by the auction system for a subject of an auction;

updating a delay component based on the updating of the auction system current price, the auction system using the delay component to reject bids received before expiration of a time portion of the delay component;

communicating the auction system current price to a remote bidder system;

updating a remote bidder system current price with the auction system current price communicated to the remote bidder system;

transmitting a message related to the subject of the auction from the remote bidder system to the auction system, the message including a bid offer based on the remote bidder system current price, the bid offer accepting the auction system current price foe the subject of the auction;

accepting, by the auction system, the bid offer where a then current price maintained by the auction system for the subject of the auction is the same as the remote bidder system current price and where the time portion of the delay component has expired;

rejecting, by the auction system, the bid offer where a then current price maintained by the auction system for the subject of the auction is the same as the remote bidder system current price and where the time portion of the delay component has not expired; and rejecting, by the auction system, the bid offer where the then current price maintained by the auction system for the subject of the action is different from the remote bidder system current price.

16. A method for remote auction bidding, comprising:

updating an auction system with an auction system current price established by the auction system for a subject of an auction;

communicating the auction system current price to a remote bidder system;

displaying the auction system current price on the remote bidder system;

identifying a bid by a user using the remote bidder system placed before an expiration of a comprehension time following the auction system current price displaying on the remote bidder system; and preventing the user from bidding at a previous price for the subject of the auction.

17. The method of claim 16, further comprising preventing the bid by the user using the remote bidder system when the bid is placed before the expiration of the comprehension time following the auction system current price being displayed on the remote bidder system.

18. The method of claim 16, further comprising warning user where the bid by the user using the remote bidder system was placed before the expiration of the comprehension time following the auction system current price being displayed on the remote bidder system.

19. The method of claim 16, further comprising requesting the user to confirm the bid by the user using the remote bidder system where the bid was placed before the expiration of the comprehension time following the auction system current price being displayed on the remote bidder system.

* * * * *

UNITED STATES PATENT AND TRADEMARK OFFICE
CERTIFICATE OF CORRECTION

PATENT NO. : 7,428,501 B2 Page 1 of 1
APPLICATION NO. : 10/831503
DATED : September 23, 2008
INVENTOR(S) : David L. Dinwoodie It is certified that error appears in the above-identified patent and that said Letters Patent is hereby corrected as shown below:

Claim 15, Col. 35, line 42 replace "foe" with -- for --.

Signed and Sealed this

Sixth Day of January, 2009

JON W. DUDAS
*Director of the United States Patent and Trademark Office*